(12) United States Patent
Scott et al.

(10) Patent No.: US 8,114,804 B2
(45) Date of Patent: *Feb. 14, 2012

(54) SELF-DEAGGLOMERATING SUSPENSIONS OF TITANIUM (IV) OXIDES AND METHODS FOR MAKING THEM

(75) Inventors: David M. Scott, Wilmington, DE (US); Carmine Torardi, Wilmington, DE (US); Vladimir Grushin, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/515,774

(22) PCT Filed: Dec. 20, 2007

(86) PCT No.: PCT/US2007/026102
§ 371 (c)(1),
(2), (4) Date: Jan. 19, 2010

(87) PCT Pub. No.: WO2008/140506
PCT Pub. Date: Nov. 20, 2008

(65) Prior Publication Data
US 2010/0144518 A1  Jun. 10, 2010

Related U.S. Application Data

(60) Provisional application No. 60/876,384, filed on Dec. 21, 2006.

(51) Int. Cl.
*B01J 23/00* (2006.01)
(52) U.S. Cl. ........ 502/171; 502/242; 502/350; 502/325; 502/305; 423/335; 423/339
(58) Field of Classification Search .................. 423/610, 423/628, 339; 502/350, 242
See application file for complete search history.

(56) References Cited

U.S. PATENT DOCUMENTS 4,861,572 A * 8/1989 Sugoh et al. .................. 423/339
(Continued)

FOREIGN PATENT DOCUMENTS

EP  0275688  3/1992
(Continued)

OTHER PUBLICATIONS

Synthesis and Photocatalytic Activity of Mesopoprous Anatase Prepared From Tetrabutylammonium-Titania Composites. L.Saadoun et al. Material Research Bulletin 35.(2000).*
The Growth Kinetics of TiO2 Nanoparticles From Titanium (IV) Alkoxide At High Water/Titanium Ratio.Gerko Oskam et al. J. Phys. Chem 2003. 107 1734-1738.*

(Continued)

*Primary Examiner* — Melvin Mayes
*Assistant Examiner* — Colette Nguyen

(57) ABSTRACT

A process for making a self-deagglomerating suspension, in particular, a suspension which self-deagglomerates to form a substantially transparent suspension, of finely divided titanium (IV) oxide particles, comprising:
  vigorously mixing
  (a) a volume of a first component comprising a major proportion of an alcohol, a minor proportion of a titanium alkoxide and a minor proportion of a titanium alkoxide activator selected from the group consisting of water and a first aqueous base, and
  (b) a volume of a second component selected from the group consisting of water and a second aqueous base, at least one of the first component or the second component having a base therein, the second component being substantially free of alcohol,
  to form a mixture comprising a suspension of finely divided titanium (IV) oxide particles, the mixture having a water to titanium molar ratio ranging from about 40 to about 1 to about 5000 to about 1,
wherein the proportion of the titanium alkoxide, the proportion of the activator, the mixing vigor, and the ratio of the volume of the first component to the volume of the second component are effective for the mixture to be initially opaque and subsequently spontaneously form into a substantially optically transparent suspension.

8 Claims, 6 Drawing Sheets

U.S. PATENT DOCUMENTS

| | | | |
|---|---|---|---|
| 5,607,994 | A | 3/1997 | Tooley et al. |
| 5,631,310 | A | 5/1997 | Tooley et al. |
| 5,889,090 | A | 3/1999 | Tooley et al. |
| 5,959,004 | A | 9/1999 | Tooley et al. |
| 6,576,589 | B1 * | 6/2003 | Han et al. ............... 502/350 |

FOREIGN PATENT DOCUMENTS

| | | |
|---|---|---|
| JP | 1987-278125 | 12/1987 |
| JP | 1989-133939 | 5/1989 |
| JP | 1989-133940 | 5/1989 |
| JP | 1993-24865 | 4/1993 |
| JP | 2001-246247 | 9/2001 |
| WO | WO 2008/079311 | 7/2008 |

OTHER PUBLICATIONS

Saadoun L et al; "Synthesis and Photocatalytic Activity of Mesoporous Anatas Prepared From Tetraabutylammonium-Titania Composities" Materials Research Bulletin 35 (2000) 193-202.

Oskam et al; The Growth Kinetics of TiO2 Nanoparticles From Titanium (IV) Alkoxide at Hight Water/Titanium Ratio, J. Phys. Chem B 2003, 107, 1734-1738.

International Search Report Jun. 2, 2008.

Gustav Mie, Annalen Der Physik 25:3770445 (1908).

B. Karunagaran et al., Cryst.Res.Technol. 38:773-778 (2003).

* cited by examiner

SELF-DEAGGLOMERATING SUSPENSIONS OF TITANIUM (IV) OXIDES AND METHODS FOR MAKING THEM

RELATED APPLICATION

This application is a 371 of PCT/US2007/026102 filed Dec. 20, 2007, which claims benefit of Provisional Application No. 60/876,384 filed on Dec. 21, 2006, incorporated herein by reference in its entirety.

FIELD OF THE DISCLOSURE

The disclosure relates to processes for making suspensions of finely divided titanium (IV) oxide particles which spontaneously transform from opaque to transparent, in particular, suspensions of titanium (IV) oxide nanoparticles which spontaneously transform from opaque to transparent.

BACKGROUND

The commercial utility of nanoparticles continues to grow at a rapid pace. Two examples of large and expanding markets for nanocrystalline and nanoparticulate titanium dioxide (also commonly called "titania") are (1) optically transparent UV-absorbing coatings, i.e., coatings that absorb UV radiation but transmit visible light and (2) photocatalysis for air and water purification and in antibacterial applications. Major considerations for the titania/metal-oxide growth markets are to produce unique chemical and physical properties (such as highly reactive photochemistry for catalysis, and high optical transparency with low levels of photoreactivity for coatings) in combination with competitive manufacturing processes. The generation of new polymer/nanoparticle composites ("nanocomposite"), is an area with high potential that is currently the subject of intense investigation.

Large-scale commercial nanocrystalline $TiO_2$ can be made from titanyl sulfate via acid-base chemistry, followed by calcination which provides highly agglomerated particles. A nanoscale material can be produced via the flame hydrolysis of $TiCl_4$; however, this material is also highly agglomerated (typical agglomerate sizes are well over 300 nm). For numerous end-uses more finely divided particles are highly desirable. Since a significant amount of energy is required to reduce the size of the agglomerated particles, there has been a long felt need for a process which can synthesize finely divided titanium dioxide particles without the need for energy-intensive post-synthesis mechanical or chemical size reducing processes.

Titanium oxide particulates can be formed by hydrolyzing titanium alkoxides with water or a base. Titanium alkoxides are known to react rapidly with water to form a precipitate of agglomerated particles that must be milled to break-up the agglomerates to form small particles. JP [1989]-133939 describes a method for making titanium oxide particulates by dissolving titanium alkoxide in alcohol with a water content of 3 g/liter or less, and mixing the titanium-containing solution with an alcohol containing water and ammonia with the resultant mixture having specific mole-ratio ranges of $NH_3/Ti$ and $H_2O/Ti$. EP 0275688 and U.S. Pat. No. 4,861,572 describe a first titanium alkoxide hydrolyzation step followed by a condensation reaction to form the metal oxide having particle sizes over 1 micron in size. JP 2001-246247 describes a subsequent acid or base treatment after hydrolysis of titanium alkoxide to produce relatively large particles of $TiO_2$.

For optically transparent cosmetic or coating applications, it is important that particles not inhibit the transmission of visible light, which requires most of the particles to be smaller than about 100 nm.

It has been found that without adequate dispersion and colloidal stabilization, nanoparticles tend to form aggregates that are difficult to re-disperse and that affect optical properties in the final application. For some applications, it can be preferable for the nanoparticles to remain in suspension, preferably a suspension resulting from the synthesis, in order to preserve their size and hence their properties.

The process of this disclosure can provide an optically transparent suspension of titanium (IV) oxide nanoparticles.

SUMMARY OF THE DISCLOSURE

The disclosure relates to a process for making a suspension of finely divided titanium (IV) oxide particles, typically, finely divided titanium (IV) oxide nanoparticles, comprising:
vigorously mixing
(a) a volume of a first component comprising a major proportion of an alcohol, a minor proportion of a titanium alkoxide and a minor proportion of a titanium alkoxide activator selected from the group consisting of water and a first aqueous base; and
(b) a volume of a second component selected from the group consisting of water and a second aqueous base,
at least one of the first component or the second component having a base therein, the second component being substantially free of alcohol,
to form a mixture having a water to titanium molar ratio ranging from about 40 to about 1 to about 5000 to about 1,
wherein the proportion of the titanium alkoxide, the proportion of the activator, the mixing vigor, and a ratio of the volume of the first component to the volume of the second component are effective for the mixture to be initially opaque and subsequently spontaneously form into a substantially optically transparent suspension and products made by the foregoing process.

The ultimate suspension can have a low opacity, additionally, it can be optically translucent or optically transparent. When the suspension is translucent, it can have an optical transparency greater than about 4% over a 1 cm pathlength based on the total amount of light transmitted through the suspension. When the suspension is transparent, it can have an optical transparency greater than about 90% over a 1 cm pathlength based on the total amount of light transmitted through the suspension.

The base of the first component or the second component can be the same or different and can be selected from the group consisting of ammonium hydroxide, sodium hydroxide, sodium pyrophosphate, potassium pyrophosphate, sodium citrate, diammonium hydrogen phosphate and mixtures thereof. In one embodiment, the base of the first component or the second component or both is a weak base. The base can be a tetraalkylammonium hydroxide in which the alkyl group contains from 1 to 8 carbon atoms, typically, the base can be selected from the group consisting of tetraethylammonium hydroxide, tetra-n-butylammonium hydroxide and mixtures thereof. When base is present in the first component the concentration of base can be up to about 0.2 M in the first component. When base is present in the second component the concentration of base can range from 0.001 M to about 0.030 M in the second component. In one embodiment, the second component comprises a base and the base is selected from the group consisting of tetraethylammonium hydroxide and tetra-n-butylammonium hydroxide in a concentration up to about 0.5 M in the second component. In one embodiment, the second component comprises a base which is ammonium hydroxide in a concentration ranging from about 0.006 M to about 14.8 M in the second component.

The amount of the titanium alkoxide can be up to and including about 20 weight percent based on the entire weight of the first component when the aqueous base component contains a tetraalkyl ammonium cation. Alternately, with a different base the amount of the titanium alkoxide can be no greater than about 6 weight percent based on the entire weight of the first component.

The activator can range from about 0.2 to about 1.6 weight percent; typically about 0.8 wt. %, based on the entire weight of the first component.

The ratio of the volume of the first component to the volume of the second component can range from about 1 to about 1 to about 9 to about 1, typically, the ratio of the volume of the first component to the volume of the second component can be about 3 to about 1.

The titanium alkoxide can have the chemical structure:

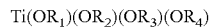

$Ti(OR_1)(OR_2)(OR_3)(OR_4)$ wherein $R_1$ to $R_4$ are the same or different alkyl groups of 1 to about 30 carbon atoms. Typically, the titanium alkoxide is selected from the group consisting of titanium (IV) isopropoxide, titanium (IV) n-butoxide, titanium (IV) methoxide, titanium (IV) ethoxide, and titanium (IV) n-propoxide and mixtures thereof.

The alcohol of the first component is a monohydric or dihydric $C_1$ to $C_{10}$ aliphatic alcohol. Typically, the alcohol is selected from the group consisting of methanol, ethanol, n-propanol, isopropanol, ethylene glycol, and butanediol and mixtures thereof.

In one embodiment, the vigorous mixing is provided by a mixer with a rotor and a stator and the rotational speed can be greater than about 500 rpm. In this instance, the shear rate is typically greater than about 100 s$^{-1}$.

In one embodiment, the suspension of titanium (IV) oxide, typically the deagglomerated suspension is dried to form a powder having the chemical composition:

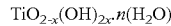

$TiO_{2-x}(OH)_{2x} \cdot n(H_2O)$ wherein x ranges from 0-2 and n is no greater than about 2, typically less than 2, more typically less than or equal to 1.

In another embodiment, the suspension of titanium (IV) oxide, typically the deagglomerated suspension, can be concentrated by removing at least a portion of the liquid medium of the suspension.

In yet another embodiment, the first component and the second component can be contacted in a continuous or a semi-continuous process.

In a still further embodiment, the suspension can be mixed with a polymer.

Typically, the volume-weighted median particle size of a suspension of titanium (IV) oxide nanoparticles made in accordance with this disclosure, measured via dynamic light scattering, is below approximately 100 nm, and typically below about 10 nm. In many typical examples of the product of the disclosure the $d_{90}$ (90$^{th}$ percentile of the volume-weighted cumulative particle size distribution) also is below 10 nm. The suspension is substantially free of a settled layer of agglomerated solids over time indicating that the suspension is stable. The particles of the deagglomerated suspension are finely divided titanium (IV) oxide particles. The finely divided particles of the deagglomerated suspension are typically substantially or fully unagglomerated nanoparticles which is surprising since nanoparticles tend to form agglomerates.

The particles in the suspension can be substantially or completely amorphous. Additionally, amorphous particles can be further treated to form a crystalline product.

The disclosure provides a process which can synthesize finely divided titanium (IV) oxide particles in suspension without the need for energy-intensive post-synthesis mechanical or chemical size reducing processes to size-reduce large agglomerates.

The process of the disclosure can provide, in as-synthesized form, a dispersion of the particles which are colloidally stable.

DETAILED DESCRIPTION

Figure 1A:
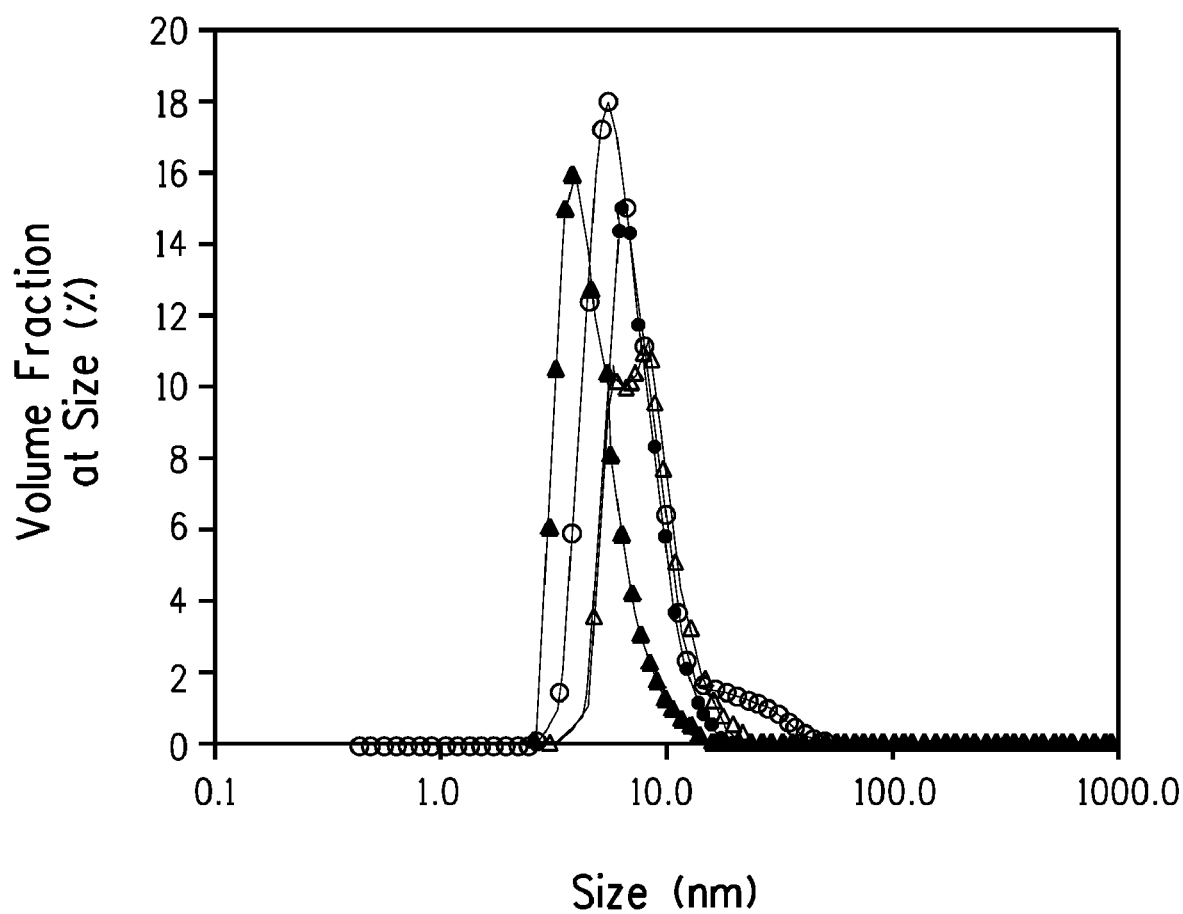
FIGS. 1a and 1b are graphs showing the particle size distribution of hydrous titanium (IV) oxide suspensions as determined by dynamic light scattering.

Disclosed are processes for producing suspensions of particles of titanium (IV) oxide and hydrous titanium (IV) oxide and compositions of matter that can be synthesized using titanium alkoxides as the starting materials. The term titanium (IV) oxide as used herein means titanium (IV) oxide and hydrous titanium (IV) oxide.

When separated from the suspension by drying under conditions suitable for avoiding crystallization, the titanium (IV) oxide can have the chemical composition:

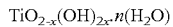

$TiO_{2-x}(OH)_{2x} \cdot n(H_2O)$ wherein x ranges from 0-2 and n is no greater than about 2, typically less than 2, more typically less than or equal to 1. The conditions suitable for avoiding crystallization can be by drying in air at about 20 to about 25° C.

The titanium (IV) oxide particles can be said to be directly synthesized by contacting a first component and a second component in accordance with the disclosure since there is no need for subsequent particle isolation steps such as vacuum distillation or size-reducing steps. Thus, in one embodiment, the particles can be made by a process consisting essentially of contacting the first component and the second component.

The first component comprises a titanium alkoxide. The titanium alkoxide can be represented by the chemical structure:

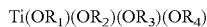

$Ti(OR_1)(OR_2)(OR_3)(OR_4)$ wherein $R_1$ to $R_4$ are the same or different alkyl groups of 1 to about 10 carbon atoms, preferably 1 to about 6 carbon atoms and, optionally, one or more heteroatoms such as oxygen, nitrogen or sulfur. The hydrocarbon group can be a straight chain or branched and be saturated or unsaturated. The number of carbon atoms of the hydrocarbon can be limited by the solubility of the alkoxide in the alcohol. Specific examples of suitable alkoxides include titanium (IV) isopropoxide (commercially available from E.I. du Pont de Nemours and Company under the name Tyzor® TPT (Ti(OC$_3$H$_7$)$_4$) and titanium (IV) n-butoxide (commercially available from E.I. du Pont de Nemours and Company under the name Tyzor® TBT (Ti(OC$_4$H$_9$)$_4$). Additional examples of titanium alkoxides that can be useful are titanium (IV) methoxide, titanium (IV) ethoxide, and titanium (IV) n-propoxide. Mixtures of the foregoing titanium alkoxides may be used.

The first component comprises an alcohol. Typically, the alcohol is a monohydric or dihydric C$_1$ to C$_{10}$ aliphatic alcohol. Suitable alcohols include, but are not limited to, methanol, ethanol, n-propanol, isopropanol, ethylene glycol, and butanediol and mixtures thereof. The alcohol is present in the first component in a major proportion based on the total amount of the first component. Typically the alcohol is present in an amount of more than about 50 weight percent, more typically more than about 80 weight percent, even more typically more than about 90 weight percent based on the total weight of the first component.

The first component contains a titanium alkoxide activator, typically in a minor proportion, selected from the group consisting of water and at least one aqueous base component. The activator activates the titanium alkoxide. The source of water can be from the alcohol if the alcohol contains water of hydration in which water molecules are absorbed into the alcohol, examples of which include diols such as ethylene glycol.

The titanium alkoxide activator is present in a minor proportion based on the entire amount of the first component. Typically the amount of activator can range from about 0.2 to about 1.6 wt. %, preferably about 0.8 wt. % based on the entire weight of the first component.

The base of this disclosure suitable for use in the first aqueous base can be organic or inorganic so long as it is water soluble. Materials which are solid at room temperature that are capable of providing an alkaline pH when dissolved in water can be used. Suitable examples of bases are selected from the group consisting of ammonium hydroxide, sodium hydroxide, sodium pyrophosphate (e.g., Na$_4$P$_2$O$_7$.10H$_2$O), potassium pyrophosphate (e.g., K$_4$P$_2$O$_7$), sodium citrate (e.g., Na$_3$C$_6$H$_5$O$_7$.2H$_2$O), diammonium hydrogen phosphate (e.g., (NH$_4$)$_2$HPO$_4$) and mixtures thereof. Tetraalkylammonium hydroxides in which the alkyl group contains from 1 to 8 carbon atoms can also be suitable as a base. Examples of suitable tetraalkylammonium hydroxides are selected from the group consisting of tetraethylammonium hydroxide (e.g., (CH$_3$CH$_2$)$_4$NOH), tetra-n-butylammonium hydroxide (e.g., (CH$_3$CH$_2$CH$_2$CH$_2$)$_4$NOH) and mixtures thereof. The base of the first component, when present, is mixed with water to form a first aqueous base.

When barium hydroxide was tested in the first component it was found to cause agglomeration under the specific conditions of the tests. Thus, barium hydroxide may not be a suitable base but suitable conditions within the scope of this disclosure may be found. As such, barium hydroxide or mixtures of barium hydroxide with other bases described herein are not to be excluded by the present disclosure.

When base is present in the first component the concentration generally can be as high as about 0.2 M, typically about 0.1 M, more typically about 0.001 to about 0.05 M in the first component.

The concentration of titanium alkoxide in the first component can vary depending upon the presence of base and the selection of type of base in the first component. In any event the titanium alkoxide is present in a minor proportion based on the entire amount of the first component. Typically a minor proportion means that the titanium alkoxide concentration in the first component can be as high as about 10 wt. % or higher, typically up to and including about 20 wt. %, based on the entire weight of the first component. Usually, the titanium alkoxide concentration does not exceed about 6 wt. %, typically about 5 wt. % and is preferably no more than 4 wt. % based on the entire weight of the first component. However, when tetra-alkylammonium hydroxide is present in the first component the titanium alkoxide concentration can be about 10 wt. % or higher such as up to and including about 20 wt. %. The lower limit of the titanium alkoxide concentration is greater than zero, typically the lower limit is about 0.001 wt. %, more typically about 0.01 wt. %, even more typically about 0.02 wt. %.

The first component can be prepared by mixing the alcohol with the activator. If sufficient water of hydration is present in the alcohol the water of hydration can function as the activator. The mixture of alcohol and the activator can then be mixed with the titanium alkoxide. Adding the titanium alkoxide after mixing the alcohol with the activator is useful for avoiding forming a precipitate in the first component. A mechanism for rapidly dispersing the activator throughout the titanium alkoxide-alcohol mixture could avoid precipitate formation. As an example, spraying the activator into a mixture of alcohol and titanium alkoxide while mixing could avoid forming a precipitate.

The first component can be prepared under ambient conditions, typically room temperature, for example from about 20 to about 25° C. and atmospheric pressure. The temperature need not be elevated above ambient temperatures.

The second component comprises water or at least one aqueous base. The second component is substantially free of alcohol. The second component being substantially free of alcohol is not meant to exclude trace amounts of alcohol which might be present as an impurity in the ingredients such as when commodity materials are used. Alternately, the second component can be free of alcohol.

If a base is present in the first component, the base in the second component can be the same as or different from the base of the first component.

The base of this disclosure suitable for use in the second component can be organic or inorganic so long as it is water soluble and can be the same or different from the base of the first component, if a base is present in the first component. Materials which are solid at room temperature that are capable of providing an alkaline pH when dissolved in water can be used. Suitable examples of bases are selected from the group consisting of ammonium hydroxide, sodium hydroxide, sodium pyrophosphate (e.g., Na$_4$P$_2$O$_7$.10H$_2$O), potassium pyrophosphate (e.g., K$_4$P$_2$O$_7$), sodium citrate (e.g., Na$_3$C$_6$H$_5$O$_7$.2H$_2$O), diammonium hydrogen phosphate (e.g., (NH$_4$)$_2$HPO$_4$) and mixtures thereof. Tetraalkylammonium hydroxides in which the alkyl group contains from 1 to 8 carbon atoms can also be suitable as a base. Examples of suitable tetraalkylammonium hydroxides are selected from the group consisting of tetraethylammonium hydroxide (e.g., (CH$_3$CH$_2$)$_4$NOH), tetra-n-butylammonium hydroxide (e.g., (CH$_3$CH$_2$CH$_2$CH$_2$)$_4$NOH) and mixtures thereof. The base of the second component, when present, is mixed with water to form a second aqueous base.

The target pH of the second component can be above about 8, typically about 9 or even higher, such as 11.

The concentration of base present in the second component can vary depending upon the choice of base and whether base is present in the first component. The concentration of base in the second component can typically range from about 0.001 M to about 0.030 M, preferably about 0.002 M to 0.016 M, and most preferably about 0.003 M to 0.010 M in the second component.

However, tetraethylammonium hydroxide and tetra-n-butylammonium hydroxide can be used in effective concentrations higher than indicated above, up to about 0.5 M, more typically up to about 0.25 M even more typically up to about 0.2 M, in the second component, to synthesize titanium (IV) oxide nanoparticles in a suspension of about 3 wt. % titanium (IV) oxide based on the total amount of dry titanium (IV) oxide that could be obtained from the suspension. The lower limit of the tetraethylammonium hydroxide and tetra-n-butylammonium hydroxide concentration can be about 0.001 M, typically about 0.002 M, more typically about 0.003 M, in the second component.

Moreover, ammonium hydroxide is a preferred base that can be used in the second component. The concentration of ammonium hydroxide, in the second component, can range from about 0.006 M to about 14.8 M, with about 0.04-0.06 M ammonium hydroxide being preferred.

A base is present in at least one of the first and second components. Thus, when the first component comprises alcohol, water and titanium alkoxide and is free of added base, the second component is an aqueous base component, and when base is present in the first component the second component can be free of base.

When the second component comprises an aqueous base, it can be prepared by mixing the base with the water, typically deionized water. When the base is a solid at room temperature, such as tetrasodiumpyrophosphate decahydrate, a minor amount of the solid is dissolved in a major amount of water with stirring. When the base is a liquid at room temperature a minor amount can be added into a major amount of water while stirring. The second component can be prepared under ambient conditions, for example about 20 to about 25° C. and atmospheric pressure.

The first component and the second component are contacted under conditions effective for forming a suspension of titanium (IV) oxide particles which is substantially free of agglomerates. Additionally, the mixture can be substantially optically transparent.

To avoid the formation of a slurry of agglomerated particles, a volume of the first component can be added to a volume of the second component and the ratio of the volume of the first component to the volume of the second component can range from about 1 to about 1 to about 9 to about 1, preferably about 3 to about 1, i.e., 3 parts first component to 1 part second component.

The second component can contain a significant stoichiometric excess of water. The total amount of water of the mixture of the first component and the second component is significantly greater than required by the stoichiometry. The mixture of components can have molar ratios of water to titanium greater than about 40 to about 1. Typically, the total water to titanium molar ratio of the mixture ranges from about 40 to about 1 to about 5000 to about 1, more typically from about 50 to about 1 to about 600 to about 1, and even more typically from about 85 to about 1 to about 300 to about 1.

Surprisingly, at such high water concentrations a suspension of finely divided titanium (IV) oxide nanoparticles which are substantially free of agglomerates and, additionally, having low opacity, more additionally substantially optically transparent, can be formed.

The target pH of the mixture of the components is typically greater than or equal to about 6, more typically greater than about 7. By way of example only, when the first component is free of base, but contains water, and the second component contains ammonium hydroxide in a concentration ranging from about 0.04 to about 0.06 M, the pH of the resulting suspension can be about 7 indicating consumption of hydroxide ions. In the process of the disclosure, the particles are formed in a neutral to basic pH range. Such pH values thereby avoid an environment in which the particles tend to agglomerate.

Since the first component can have a short shelf-life, in one embodiment of the disclosure that can be useful for large scale production, a mixture of alcohol and activator is established to flow, by gravity or by a pump, into a flow of the second component. The alkoxide is injected into a flow of the mixture of alcohol and activator before the flow of the mixture of alkoxide, alcohol and activator contacts the second component.

The first component and the second component are vigorously mixed. By vigorously mixing it is meant that there is a substantial absence of laminar flow when the components are mixed. Increasing the vigor of mixing has been found to relate to increasing transparency of the suspension The conditions for contacting the first component and the second component can be turbulent or can have a high rate of shear in order to mix the first component and the second component under conditions that can provide a suspension which is substantially free of agglomerates and substantially optically transparent. This contacting step can be carried out with sufficient vigor to create a substantially optically transparent suspension of titanium (IV) oxide nanoparticles within the time scale of the process. Typically the mixing shear rate is over about $100\ s^{-1}$, more typically the shear rate can range from about 1000 to about $20,000\ s^{-1}$. Alternatively, the mixing vigor can be accomplished by contacting the components using a static mixer or other well known mixing apparatus that can provide a high rate of mixing.

Mixing conditions preferably take into account how rapidly the components are contacted while one of the components is agitated, for example by stirring. It has been found that even when one component is stirred, dropwise addition of the other component does not form a suspension of finely divided particles.

Vigorous missing can be terminated once a suspension of titanium (IV) oxide particles is formed. Mixing, even gentle mixing, is not always required to maintain the suspension.

The first component and the second component can be contacted in any order. The second component can be added to the first component or the first component can be added to the second component or the first and second components can be mixed together simultaneously.

In one embodiment, the second component is poured into the first component which is in a stirred container. In a batch process, a vessel can be provided which contains either the first or the second component. Typically the component of the vessel is agitated by rapid stirring with a mechanical stir bar. While the component is being agitated, the other component is added to the vessel. The speed of addition can direct the optical clarity of the resulting suspension. Slow addition can lead to a translucent suspension within the scope of the disclosure which contains nanoparticles. Slow addition can mean that the other component is added over a period of time ranging from about 5 seconds up to about one minute. For high transparency, fast addition is preferred. Fast addition can mean that the other component is added in about five seconds or less.

The titanium (IV) oxide can be made in a continuous or a semi-continuous process.

For small batch production, on the order of less than about 1000 mL, the second component can be rapidly poured by hand into the first component. The first component, typically, is of larger volume than the second component. The first component, typically, is in a stirred container wherein the stir bar of the stirred container can be located off-center to intensify stirring. However, any suitable technique for maintaining highly turbulent conditions while contacting the first component and the second component can be employed especially for larger scale production. Examples of suitable equipment for maintaining highly turbulent conditions include a homogenizer wherein the rotor speed is greater than about 500 rpm, typically from about 1000 to about 30,000 rpm, and a T-mixer in which feedstreams of the first component and the second component are directed towards each other in a manner that can provide a sufficient flow condition for sufficiently complete and, preferably, rapid mixing.

Figure 6:
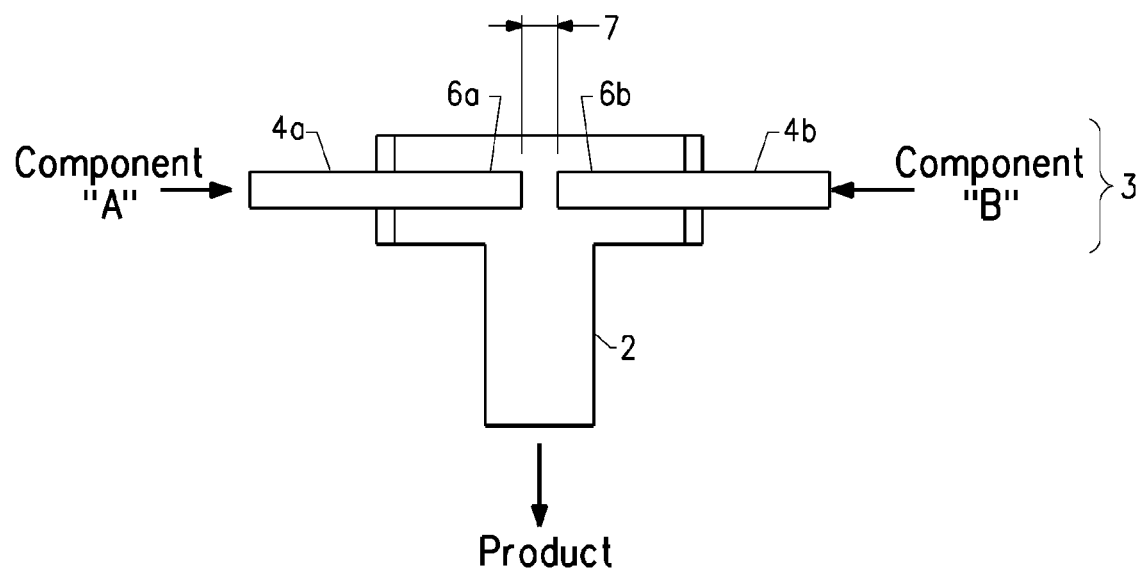
FIG. 6 is a simplified schematic diagram of the "T" mixer.

A simplified drawing of a T-mixer is shown in FIG. 6. The T-mixer comprises a mixing tube 2 having an upper portion 3 with two feed tubes 4a and 4b fitted at the upper portion of the mixing tube 2 each feed tube having an end 6a and 6b positioned perpendicular to the mixing tube. Each feed tube is for introducing one of the components into the mixing tube. The feed tubes are positioned within the mixing tube such that there is a gap 7 located between the ends of each feed tube. The cross-sectional areas of the tubes can be chosen so that the volumetric flow rate required to mix the two components in the correct ratio would yield approximately equal velocities of the two jets.

The feed components are introduced to the mixing tube by way of the feed tubes so that they flow towards each other to form a mixture under turbulent mixing conditions.

Even when one of the components is rapidly agitated, for example by stirring, fast addition of the other component is typically necessary to provide high optical transparency. It has been found that when the first and second components are contacted under conditions of low shear (i.e., by pouring one into the other over the course of a few seconds) the particles can agglomerate or even aggregate. In particular, it was found that drop-wise addition of the first component into the second component can produce large agglomerates with diameters of tens or hundreds of microns. Such agglomerates and aggregates are difficult to disperse into nanoparticles.

The contacting conditions and the proportion of ingredients in the first component and the second component can yield a stable suspension of finely divided titanium (IV) oxide nanoparticles.

The $d_{90}$ ($90^{th}$ percentile of the cumulative volume-weighted particle size distribution), measured via dynamic light scattering, can be below about 100 nm, and typically below about 10 nm, typically having a lower limit of about 4 nm. Additionally, the particles can have a volume-weighted median size ($d_{50}$) of about 3 nm to about 20 nm, more typically about 5 nm.

The suspension in the as-synthesized concentration can be substantially optically transparent. Thus, transparency values used herein refer to the suspensions in the as-synthesized concentrations. Suspensions of titanium (IV) oxide nanoparticles made following the process of the present disclosure can have transparencies greater than about 4%, and more typically over about 90%. High optical transparency suspensions can be made which are useful for end-uses requiring a high transparency such as packaging film and clear containers. When high optical transparency suspensions are desired they can be made such that the transparency (over a 1 cm path length) in the visible spectrum is greater than about 80%, most preferably greater than about 95% up to and including 100%, based on the total light transmission. Additionally optically translucent suspensions can be made which permit the passage of light in a diffuse manner so that objects beyond cannot be clearly seen which can be useful for end-uses that do not require high transparency. Translucent suspensions can have a transparency (over a 1 cm path length) in the visible spectrum of about 4% to about 20%.

The process of this disclosure avoids the need for energy-intensive post-synthesis mechanical or chemical size-reducing processes such as grinding in order to form finely divided titanium (IV) oxide nanoparticles.

The titanium (IV) oxide particles can have an intrinsically low photoactivity compared to crystalline titanium oxide, as described herein below.

The ultraviolet light cut-off wavelength of the suspension can be approximately 330 to approximately 350 nm, below which wavelength ultraviolet light is substantially blocked by the suspension.

As used herein, the term "suspension" means a mixture of titanium (IV) oxide particles that are more or less evenly distributed throughout a liquid medium. The suspension is preferably substantially free of flocs or agglomerates (i.e., clusters of particles held together by relatively weak forces, such as van der Waals forces, electrostatic forces or surface tension). Even though the suspension may be substantially free of flocs or agglomerates, the incidental presence of a very small number of flocs or agglomerates present as a minor consequence of the process is not excluded. When the suspension is free of flocs or agglomerates, however, it lacks even incidental flocs or agglomerates. Usually, the suspension is an easily flowable liquid at room temperature (about 20° C. to about 25° C.) but it can be a gel at room temperature.

The process of this disclosure can provide in situ stabilization of the titanium (IV) oxide particles as they are formed which contributes to the formation of finely dispersed particles and substantially optically transparent suspensions of titanium (IV) oxide nanoparticles.

In one embodiment, the mixture can be initially opaque and subsequently spontaneously form into a substantially optically transparent suspension. In this embodiment, the process forms a composition which can provide in situ self-deagglomeration or "spontaneous peptization" of the titanium (IV) oxide particles under certain conditions. Thus, even in cases where an opaque, white suspension is initially produced it has been found that on standing, the suspension spontaneously transforms into a substantially optically transparent suspension containing the finely divided titanium (IV) oxide without additional processing such as, grinding or other high energy input to convert the suspension of agglomerated titanium (IV) oxide particles into a highly optically transparent suspension of titanium (IV) oxide nanoparticles evenly distributed throughout the liquid medium.

With low volume ratios of the appropriate first component and second component, white opaque slurries can form. The opaque slurries may initially be formed having particles with median sizes of about 2 microns. Typically the initially opaque slurry will have a transparency of less than 5% over a 1 cm pathlength. The opaque slurries can transform, or self-deagglomerate, into optically transparent suspensions. Typically, the optically transparent suspensions contain particles having a median particle size of about 25 nm or less, and typically as low as about 3 nm, within about 1-180 minutes. This can occur spontaneously on standing or with stirring. The low volume ratio suitable for self-deagglomeration of the slurry can be from about 1 to about 1 to about 3 to about 1, typically about 1 to about 1 to about 2 to about 1. Thus, if spontaneous deagglomeration (i.e., spontaneous peptization)

is observed, then its time scale is the span of time after the two components are mixed together for the suspension to become substantially optically transparent.

The particle size distribution (PSD) is affected by the presence of the activator, relative concentrations of reactants, volume ratios of the first and the second components and the contacting conditions.

The first component and the second component can be contacted at a temperature ranging from just above the freezing point of the final mixture up to the boiling point of the mixture. Typically, however, it is convenient to perform the reaction at temperatures below about 30° C., typically at ambient conditions, such as in the room temperature range of about 20 to about 25° C.

The present titanium (IV) oxide as-synthesized typically is substantially amorphous but it is contemplated that crystalline material could be formed at higher reaction temperatures. The amorphous nature of the titanium (IV) oxide can provide the benefit of significantly reduced photoactivity as high photoactivity tends to cause problems in certain applications. However, if crystalline material is desired, it can be made from the amorphous hydrous titanium (IV) oxide of the disclosure. The amorphous material can be converted to crystalline material, typically anatase, by heating to about 50° C. or higher, typically from about 80° C. to the boiling point at atmospheric pressure. Under pressure, higher temperatures can be used, as would be apparent to those skilled in the art. The material can be heated by boiling the suspension for an extended period of time. The period of time can depend upon the ingredients. The time periods can range from about 1 hour to about 72 hours or even longer. Conversion to anatase crystals can be accelerated by boiling the suspension in the presence of sodium pyrophosphate. The heating process can be by induction heating.

The titanium (IV) oxide suspensions of the disclosure can comprise particles with sizes well below 100 nm and can be highly optically transparent to visible light, fulfilling the optical requirements needed for many end-uses. In addition, the suspension produced by this disclosure can exhibit ultraviolet (UV) absorption essentially the same as that of nanocrystalline titanium (IV) oxide, making them potentially suitable for applications requiring such energy absorption (e.g., in sunscreen cosmetics). Further, the suspensions, modified suspensions, or powders derived from these suspensions, can be used in polymers and can produce optically clear, tough, scratch-resistant coatings. Other uses for the product or modified product of the disclosure may be envisaged, such as in chemical catalysis and photocatalysis for air and water purification or self-cleaning surfaces, or antibacterial and anti-odor applications. Well-known methods for making end-use products containing titanium (IV) oxide can be used.

High resolution Transmission Electron Microscopy (TEM) of titanium (IV) oxide particles produced at room temperature and atmospheric pressure fails to detect an electron diffraction pattern, suggesting that the titanium (IV) oxide is amorphous, meaning that it has virtually no crystalline structure.

A direct result of the lack of crystallinity is that the nanometric titanium (IV) oxide described in the present disclosure is significantly more photostable than either rutile or anatase, which are the commonly occurring forms of $TiO_2$ used in commerce. From a practical viewpoint, this finding means the amorphous particles do not require a photopassivation treatment to prevent them from promoting harmful free-radical side reactions.

The suspensions produced by the process typically do not exceed a titanium (IV) oxide concentration of about 3 wt. % based on the entire weight of the suspension. The concentration can depend upon the choice of base. Typically, concentrated suspensions (about 3 wt. % titanium (IV) oxide on a dry basis) of titanium (IV) oxide nanoparticles can be made directly, without additional treatment of the sample, by using tetra alkyl ammonium hydroxide such as tetra-n-butylammonium hydroxide (TnBAOH) and tetraethylammonium hydroxide (TEAOH).

However, for certain end uses requiring a higher concentration (over 3, typically over 5 wt. %) of titanium (IV) oxide nanoparticles in suspension the particle surface chemistry can be adjusted to minimize particle growth. The amorphous titanium (IV) oxide suspensions are unstable at lower pH, typically a pH below about 6 and become translucent gels. However, they are very stable (not forming a gel) at a higher pH, typically above about 8, more typically a pH ranging from about 9 to about 10, even when a large excess of concentrated ammonium hydroxide solution is used. Depending upon the starting concentration of the suspension, clear concentrates up to 17.8 wt. %, typically from about 0.1 wt. % to about 17.8 wt. %, based on the entire amount of the suspension can be obtained by removing the liquid medium of the suspension, for example, by low-temperature (<40° C.) vacuum distillation of 0.5 wt. % suspensions. This method of concentrating the suspensions causes very little agglomeration of the particles.

The products of the process of this disclosure can be treated with a composition comprising an element selected from the transition metals, or Groups IIIB or IVB of the Periodic Table of the Elements (Sargent-Welch Scientific Company, 1979). The treatment may be applied using techniques known by those skilled in the art. Specific examples of treatment may include inorganic oxide treatments s such as silica, alumina, zirconia among others. Such treatments may be present in an amount of 0.1 to 10 wt. %, based on the total weight of the titanium (IV) oxide, preferably 0.5 to 3 wt. %. Typically the particles are surface treated.

Any suitable silicon-, aluminum-, or zinc-containing compound which can surface treat the particles with an oxide of silicon, aluminum or zinc can be used. Typically, the source of silicon is tetraethyl ortho silicate (TEOS), the source of aluminum is triethoxy aluminum and the source of zinc is 2-methoxy ethoxide.

The particles can be surface treated by making a solution of the source of silicon, aluminum and/or zinc in dry alcohol such as dry isopropyl alcohol. The solution can be introduced to a suspension of the particles, typically by metering a quantity of the solution into the suspension while stirring the suspension.

By "surface treated" it is meant that the particles have been contacted with a source of the desired treatment wherein the compounds are adsorbed on the surface of the particles or, a reaction product of at least one of the compounds with the particle is present on the surface as an adsorbed species or chemically bonded to the surface. The compounds or their reaction products or combination thereof may be present as a coating, either single layer or double layer, continuous or non-continuous, on the surface. Typically, a continuous coating comprising the silicon-containing compound is on the surface. The surface treatment can reduce photoactivity.

The particles can be silanized as described in U.S. Pat. Nos. 5,889,090; 5,607,994; 5,631,310; and 5,959,004, which are incorporated herein by reference in their entireties. As described in the foregoing patents, the particle may also contain ingredients added thereto to further improve dispersibility characteristics of other properties such as durability. Thus, by way of example, but not limited thereto, the particle may contain additives and/or inorganic oxides, such as aluminum, silicon or tin as well as triethanolamine, trimethylolpropane, phosphates, phosphites, polyols and substituted polyols, silicones, and alkanolamines, such as triethanolamine.

The particles can be isolated by drying the untreated or treated suspension to form a powder. The product can be spray dried with an inert gas such as nitrogen. The spray dried product can be a fluidizable powder. The spray dried powder can be agglomerates of nanoparticles having a particle size distribution when the agglomerates are dispersed in water and measured wherein the volume-weighted particle size diameter of 50 percent of the particles ($d_{50}$) is less than about 100 nm, typically about 90 nm.

The titanium (IV) oxide suspensions of this disclosure can be synthesized easily and rapidly at room temperature, or at any convenient temperature between the freezing and boiling points of the solvent system selected. Producing dispersed titanium (IV) oxide particles in situ eliminates the high-energy grinding and milling procedures that would otherwise be needed to disperse titanium (IV) oxide. The titanium (IV) oxide can be isolated into dry powders that can be easily re-dispersed to provide a suspension having a larger particle size distribution than the particle size distribution of the source suspension.

Concentrated suspensions made with this process can be incorporated into an acrylic latex polymer to give a highly optically transparent composite film.

Products of this disclosure can be employed in purification processes to remove contaminants, such as water purification, by well-known techniques.

Description of Test Methods and Equipment

X-ray Powder Diffraction: Room-temperature powder x-ray diffraction data were obtained with a Philips XPERT automated powder diffractometer, Model 3040. Samples were run in batch mode with a Model PW 1775 or Model PW 3065 multi-position sample changer. The diffractometer was equipped with an automatic variable slit, a xenon proportional counter, and a graphite monochromator. The radiation was CuK(alpha) (45 kV, 40 mA). Data were collected from 2 to 60 degrees 2-theta; a continuous scan with an equivalent step size of 0.03 deg; and a count time of 0.5 seconds per step.

Particle Size Measurement: Volume-weighted particle size distributions were measured on a Malvern Instruments Ltd. Zetasizer nano-S, which uses the Dynamic Light Scattering (DLS) technique. The vendors software (version 4.10) was set to record 36 runs of 10 seconds each, with an equilibration time of 4 minutes at a temperature of 25 degrees Celsius. The "general purpose" (i.e., multi-modal) data inversion routine was selected. Comparative Example C produced particles that were too large to be measured with DLS, so the PSD of that sample was measured on a Malvern Instruments Mastersizer 2000, which uses the laser diffraction (also called "static light scattering") technique.

As used in the examples, the median particle size refers to the volume-weighted median size of the dispersed particles and not to the crystallite size in polycrystalline material. It is possible for instance to make a polycrystalline material with a high surface area and crystallites less than 10 nm in size, yet that can only be partially dispersed. The dispersed particles of such a sample would be aggregates tens or hundreds of microns in diameter. Since the crystallites in a given aggregate particle would not be dispersed (separated from each other), the size of the crystallites is to a first approximation irrelevant to the optical scattering. The optical transparency of the suspension was determined by the particle size distribution of the aggregates.

The particle sizes reported throughout the specification refer to the particle sizes measurements determined in accordance with this particle size measurement procedure.

Optical Properties: One important characteristic of nanoparticles is that, when properly dispersed, they are relatively optically transparent to visible light. Many commercial applications of nano $TiO_2$ require that some level of optical transparency be achieved without sacrificing other important properties, such as protection against UV light. Therefore the ultraviolet/visible (UV-Vis) optical properties of these hydrous titanium (IV) oxide suspensions were measured by absorption and transmission spectroscopy.

Absorption Measurement: The absorption spectra were measured over a 0.1 mm optical path. The spectra were obtained using a Cary 5 UV/VIS/NIR spectrophotometer. The spectrometer was controlled with a Dell PC and Varian WinUV version 3.0 software. A baseline was collected from 800 to 200 nm with empty sample and reference beams. Sample solutions were then loaded into a 0.1 mm quartz cell and placed in the sample beam. The spectra were acquired versus the empty reference beam.

Transmission Measurement: The measurement of transmission, rather than absorption, is an alternative tool for examining differences between highly optically transparent samples. Transmission spectra were measured with a spectrophotometer over a 1 cm optical path length defined by the dimension of the cuvette containing a sample. In order to account for reflections at the interfaces between air, cuvette, and suspension, a cuvette containing only the continuous phase (e.g., a 70% alcohol/30% water mixture in the case of the suspensions produced by this disclosure) is measured first. These data are used to normalize subsequent readings to obtain the transmission coefficient as a function of wavelength.

For easy comparison of these results, the optical transparency factor (% T) is defined as the weighted average of the transmission coefficient, using the CIE photopic luminous efficiency function (PLEF) as the weighting factor. Thus the optical transparency is calculated as $$\% T = \frac{\sum_\lambda t(\lambda) \cdot PLEF(\lambda)}{\sum_\lambda PLEF(\lambda)}$$

where $t(\lambda)$ is the transmission coefficient (in percent) at each wavelength $\lambda$, measured over a specified optical path length. For all the transmission coefficient data shown in this disclosure, the optical path length is 1 cm.

UV-Visible spectra and determination of transparency were measured on an Ocean Optics Inc. fiber-optic spectrophotometer Model S2000-UV-VIS, using an Analytical Instrument Systems Inc. Model Mini-DT deuterium light source and an Ocean Optics Model CUV cuvette holder. The spectra were recorded with an integration time on the order of 30 ms, and the optical path length through the sample was 1 cm.

Photoactivity Measurement: The photoactivity of the products of the Examples was determined by the phenol photoxidation test. Experiments were performed with UV light from a 450 W Hg-vapor lamp in a photochemical reactor immersion well. The test sample and a commercial Degussa P-25 titanium dioxide (ca. 75:15 anatase:rutile) control in individual test tubes were symmetrically arranged in a carousel-like apparatus in a temperature-controlled water bath. To facilitate the reaction, both $O_2$ sparging and magnetic stirring of each sample was utilized to provide uniform mixing. To permit only UV radiation within desired 300-400 nm range to reach the reaction solution (1 mM phenol), a Pyrex® filter was put in place. The jacketed reactor was water-cooled throughout the operation and for at least 6 min. after shutdown to prevent overheating of the lamp, thereby assuring proper operation. In addition to initial samples taken prior to UV exposure, lamp operation was suspended during set intervals (5, 20, and 60 min.) to draw samples for gas chromatograph injections. The gas chromatography indicated the disappearance of phenol due to photo-oxidation. A calibration curve of the neat phenol solution at different concentrations (1.0, 0.5, 0.2, and 0.1 mM) was also measured, analyzed, and recorded for calibration of each experimental run. Relative reaction rate constants, based on the internal P-25 standard, were calculated.

Shear Rate: The shear rate reported in the examples, measured in $s^{-1}$, was calculated by multiplying the rotational velocity (revolutions per second) by the ratio of the rotor radius to the distance between the rotor and the stator.

EXAMPLES

Except as otherwise noted, all chemicals and reagents of the Examples were used as received from:

Methanol—EMD Chemicals, Gibbstown, N.J., 99.8%
Ethanol—EMD Chemicals, Gibbstown, N.J., anhydrous, denatured.
n-Propanol—EMD Chemicals, Gibbstown, N.J., 99.97%
Isopropanol—EMD Chemicals, Gibbstown, N.J., 99.5%
Ammonium hydroxide ($NH_4OH$)—J. T. Baker, Phillipsburg, N.J.,
Tetra sodium pyrophosphate ($Na_4P_2O_7 \cdot 10H_2O$)—EMD Chemicals, Gibbstown, N.J., 99.0-103.0%
Tetra potassium phyrophosphate ($K_4P_2O_7$)—Aldrich Chemical Co., Milwaukee, Wis., 97%
Sodium citrate ($Na_3C_6H_5O_7 \cdot 2H_2O$)—Sigma Chemical, St Louis, Mo.
Sodium hydroxide—(NaOH) EMD Chemicals, Gibbstown, N.J., 97.0% min.
Barium hydroxide ($Ba(OH)_2 \cdot 8H_2O$), Alfa Aesar, Ward Hill, Mass., 98+%
Diammonium hydrogen phosphate (($NH_4)_2HPO_4$)—J. T. Baker, Phillipsburg, N.J., 99.7.
Tetraethylammonium hydroxide (($CH_3CH_2)_4NOH$)—Sigma Chemical, St. Louis, Mo., 25 wt. % in methanol.
Tetra-n-butylammonium hydroxide (($CH_3CH_2CH_2CH_2)_4NOH$)—Alfa Aesar, Ward Hill, Mass., Reagent Grade, 31 wt. % in methanol.
Titanium (IV) isopropoxide—Aldrich Chemical Co., Milwaukee, Wis., 99.999%
Titanium (IV) isopropoxide—Aldrich Chemical Co., Milwaukee, Wis., 97%
Titanium (IV) n-butoxide—Aldrich Chemical Co., Milwaukee, Wis., 97%

The following Examples illustrate the present disclosure. All parts, percentages and proportions are by weight unless otherwise indicated.

Except as otherwise noted, the term "rapidly added" is used to mean that the entire contents of the beaker containing one of the components was dumped, by hand, into the beaker containing the other component as quickly as possible (in less than about one second), and vigorous mixing was provided by a stir bar positioned off the central axis of the beaker to increase the turbulence of the mixture to thoroughly mix the components in less than about five seconds of total elapsed time. These conditions for rapidly mixing the components were effective for small scale batchwise production of a suspension of amorphous hydrous titanium (IV) oxide.

Comparative Example A

This example illustrates the reaction of titanium (IV) isopropoxide (a.k.a, Tetraisopropyltitanate, $Ti(OCH(CH_3)_2)_4$ in isopropyl alcohol with a base. No activator was present in Component "A".

Component "A" was prepared by mixing 6 mL titanium (IV) isopropoxide with 300 mL isopropyl alcohol. Component "B" was made by dissolving 0.36 g tetrasodiumpyrophosphate decahydrate (TSPP) in 100 mL deionized water. Component "A" was stirred in a 600 mL beaker with a Teflon-coated magnetic stirring bar as Component "B" was rapidly added to Component "A". A white slurry formed immediately indicating the formation of large particles. Because the precipitate was white, the solids were obviously large enough (on the order of 200-300 nm) to scatter light effectively. Subsequent particle size measurements using dynamic light scattering indicated a median particle size of over 300 nm.

Comparative Example B

This example illustrates the result of reaction of titanium (IV) isopropoxide (Tetraisopropyltitanate, $Ti(OCH(CH_3)_2)_4$) in isopropyl alcohol containing about 0.8 wt. % $H_2O$ with barium hydroxide as the base.

With stirring from a Teflon-coated magnetic stir bar, Component "A" was prepared by mixing 150 mL isopropyl alcohol with 1 mL deionized water followed by the addition of 3 mL titanium (IV) isopropoxide. Component "B" was made by dissolving 0.1 g $Ba(OH)_2 \cdot 8H_2O$ in 50 mL deionized water. The pH of Component "B" was about 11. Component "A" was stirred in a 400 mL beaker with a Teflon-coated magnetic stirring bar as Component "B" was rapidly added to Component "A". A white opaque slurry of hydrous titanium oxide nanoparticles was formed.

Comparative Example C

In this Example the intermediate product of Example 1 of JP 2001-246247 was repeated. Following the first part of Example 1 of JP 2001-246247, 25 mL of isopropanol was added drop-wise to 25 mL of titanium isopropoxide (Ti $(OC_3H_7)_4$); the mixture was stirred at 400 rpm at room temperature for 10 minutes to obtain Component "A". The shear rate for this geometry and stirring rate was calculated to be 16 $s^{-1}$. Next 100 mL of de-ionized water was mixed with 200 mL of isopropanol to obtain Component "B". Component "B" was added to the beaker containing Component "A" while stirring at 400 rpm; the mixture was heated to 60° C. and stirred at 400 rpm for 2 hours. The slurry (calculated to be about 2.2 wt. % titanium (IV) oxide on a dry basis) was opaque white, with a % T estimated to be less than 0.01%.

Figure 3:
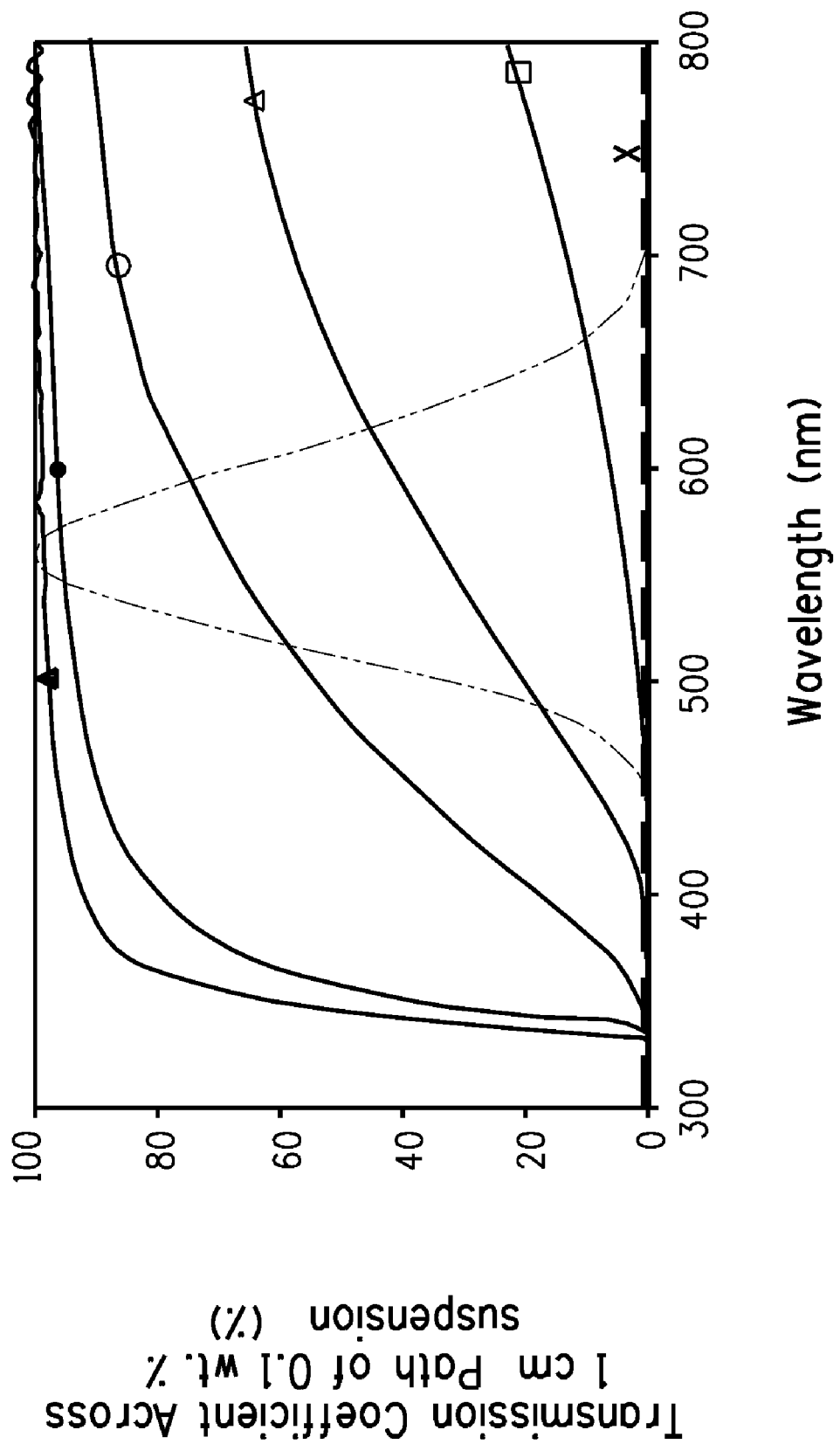
FIG. 3 compares the transmission spectra for suspensions of hydrous titanium (IV) oxide.

The measured transmission was reported in FIG. 3. The optical transparency was calculated and reported in Tables 1 and 2.

The median particle size was measured to be 54 microns (54,000 nm) using conventional laser diffraction. This result is denoted as a filled square in FIG. 4.

The product of Comparative Example C was observed to be so opaque that the measured transmission was essentially zero at visible wavelengths. The product of Comparative Example C was diluted from about 2.2 wt. % titanium (IV) oxide to about 0.1 wt. % titanium (IV) oxide by adding one part product of Comparative Example C to 21 parts of a 1:1 mixture of alcohol and water mixture (chosen to mimic the composition of the continuous phase). The transmission spectrum for this diluted product of Comparative Example C is shown in FIG. 3 as a dashed line tagged with an "x" and running along the (bottom of the graph).

Comparative Example D

This example illustrates that dropwise addition of a base to a solution of titanium (IV) isopropoxide (Tetraisopropyltitanate, $Ti(OCH(CH_3)_2)_4$) in isopropyl alcohol containing about 0.8 wt. % $H_2O$ does not give a suspension of the small particles of hydrous titanium oxide.

With stirring from a Teflon-coated magnetic stir bar, Component "A" was prepared by mixing 150 mL isopropyl alcohol with 0.5 mL deionized water followed by the addition of 3 mL titanium (IV) isopropoxide. Component "B" was made by mixing four drops (~0.12 mL) concentrated $NH_4OH$ with 50 mL deionized water. Component "A" was stirred in a 400 mL beaker with a Teflon-coated magnetic stirring bar as Component "B" was added in a dropwise manner to Component "A". A white opaque slurry formed after only a few mL of Component "B" were added. After the complete addition of Component "B", and after stirring of the slurry was stopped, the white solid began to settle.

Examples 1-3 demonstrate synthesis of the substantially optically transparent suspension when the alcohol was believed to contain water of hydration because the alcohols had been in storage over a long period of time. The exact water concentration of the alcohol was unknown.

Example 1

While stirring with a Teflon-coated magnetic stir bar, Component "A" was prepared by mixing 300 mL ethyl alcohol believed to contain an amount of water of hydration with 6 mL titanium (IV) isopropoxide. Component "B" was made by dissolving 0.36 g tetrasodiumpyrophosphate decahydrate (TSPP) in 100 mL deionized water. Component "A" was stirred in a 600 mL beaker with a Teflon-coated magnetic stirring bar as Component "B" was rapidly added to Component "A". A partially optically transparent (based on visual appearance, estimated to fall within the range of 5%<% T<20%) suspension of hydrous titanium (IV) oxide nanoparticles was formed. On a dry $TiO_2$ basis, the suspension contained about 0.5 wt. % $TiO_2$.

Example 2

While stirring with a Teflon-coated magnetic stir bar, Component "A" was prepared by mixing 300 mL n-propyl alcohol believed to contain an amount of water of hydration with 6 mL titanium (IV) isopropoxide. Component "B" was made by dissolving 0.36 g tetrasodiumpyrophosphate decahydrate (TSPP) in 100 mL deionized water. Component "A" was stirred in a 600 mL beaker with a Teflon-coated magnetic stirring bar as Component "B" was rapidly added to Component "A". A partially optically transparent (based on visual appearance, estimated to fall within the range of 5%<% T<20%) suspension of hydrous titanium (IV) oxide nanoparticles was formed. On a dry $TiO_2$ basis, the suspension contained about 0.5 wt. % $TiO_2$.

Example 3

While stirring with a Teflon-coated magnetic stir bar, Component "A" was prepared by mixing 300 mL methyl alcohol believed to contain an amount of water of hydration with 6 mL titanium (IV) isopropoxide. Component "B" was made by dissolving 0.36 g tetrasodiumpyrophosphate decahydrate (TSPP) in 100 mL deionized water. Component "A" was stirred in a 600 mL beaker with a Teflon-coated magnetic stirring bar as Component "B" was rapidly added to Component "A". A clear suspension (based on visual appearance, estimated to have a %T>80%) of hydrous titanium (IV) oxide nanoparticles was formed. On a dry $TiO_2$ basis, the suspension contained about 0.5 wt. % $TiO_2$.

In the following Examples alcohol which was not believed to have been contaminated with water because of long term storage was used along with a measured amount of water to produce substantially optically transparent suspensions.

Example 4

While stirring with a Teflon-coated magnetic stir bar, Component "A" was prepared by mixing 300 mL isopropyl alcohol with 0.5 mL deionized water followed by the addition of 6 mL titanium (IV) isopropoxide. Component "B" was made by dissolving 0.36 g tetrasodiumpyrophosphate decahydrate (TSPP) in 100 mL deionized water. Component "A" was stirred in a 600 mL beaker with a Teflon-coated magnetic stirring bar as Component "B" was rapidly added to Component "A". A highly optically transparent suspension of hydrous titanium (IV) oxide nanoparticles, resembling a clear colorless solution, was formed. The molar ratio of $H_2O$:Ti in the suspension was about 279 to about 1. On a dry $TiO_2$ basis, the suspension contained about 0.5 wt. % $TiO_2$. The particle size distribution was measured directly on this suspension by dynamic light scattering and the median particle size was 6.9 nm; the particle size distribution is shown by the filled circles in FIG. 1a.

Example 5

While stirring with a Teflon-coated magnetic stir bar, Component "A" was prepared by mixing 600 mL isopropyl alcohol with 2.0 mL deionized water followed by the addition of 12 mL titanium (IV) isopropoxide. Component "B" was made by dissolving 0.72 g tetrasodiumpyrophosphate decahydrate (TSPP) in 200 mL deionized water. Component "A" was stirred in a 1 L beaker with a Teflon-coated magnetic stirring bar as Component "B" was rapidly added to Component "A". A highly optically transparent suspension of hydrous titanium (IV) oxide nanoparticles, resembling a clear colorless solution, was formed. The molar ratio of $H_2O$:Ti in the suspension was about 280 to about 1. On a dry $TiO_2$ basis, the suspension contained about 0.5 wt. % $TiO_2$.

Example 6

While stirring with a Teflon-coated magnetic stir bar, Component "A" was prepared by mixing 300 mL isopropyl alcohol with 2.0 mL deionized water followed by the addition of 6 mL titanium (IV) isopropoxide. Component "B" was made by dissolving 0.27 g tetrapotassiumpyrophosphate (TKPP) in 100 mL deionized water. Component "A" was stirred in a 600 mL beaker with a Teflon-coated magnetic stirring bar as Component "B" was rapidly added to Component "A". A highly optically transparent suspension of hydrous titanium (IV) oxide nanoparticles, resembling a clear colorless solution, was formed. The molar ratio of $H_2O$:Ti in the suspension was about 283 to about 1. On a dry $TiO_2$ basis, the suspension contained about 0.5 wt. % $TiO_2$.

Example 7

While stirring with a Teflon-coated magnetic stir bar, Component "A" was prepared by mixing 300 mL isopropyl alcohol with 2.0 mL deionized water followed by the addition of 6 mL titanium (IV) isopropoxide. Component "B" was made by dissolving 0.24 g sodium citrate (trisodium) dihydrate in 100 mL deionized water. Component "A" was stirred in a 600 mL beaker with a Teflon-coated magnetic stirring bar as Component "B" was rapidly added to Component "A". A highly optically transparent suspension of hydrous titanium (IV) oxide nanoparticles, resembling a clear colorless solution, was formed. The molar ratio of $H_2O$:Ti in the suspension was about 283 to about 1. On a dry $TiO_2$ basis, the suspension contained about 0.5 wt. % $TiO_2$. The particle size distribution (depicted by the open triangles in FIG. 1a) was measured directly on this suspension by dynamic light scattering and the median particle size was 7.6 nm. The transmission spectrum for the product of this Example is denoted in FIG. 3 by the line tagged with a filled circle; the optical transparency was measured to be 95% and reported in Table 2.

Example 8

While stirring with a Teflon-coated magnetic stir bar, Component "A" was prepared by mixing 300 mL isopropyl alcohol with 2.0 mL deionized water followed by the addition of 6 mL titanium (IV) isopropoxide. Component "B" was made by adding 8 drops (~0.25 mL) concentrated ammonium hydroxide ($NH_4OH$) to 100 mL deionized water with stirring. The pH of Component "B" was ~10. Component "B" was rapidly added to stirring Component "A". A highly optically transparent suspension of hydrous titanium (IV) oxide nanoparticles, resembling a clear colorless solution, was formed. The molar ratio of $H_2O$:Ti in the suspension was about 284 to about 1. On a dry $TiO_2$ basis, the suspension contained about 0.5 wt. % $TiO_2$. The pH of the nanoparticle suspension was ~7. The particle size distribution was measured directly on this suspension by dynamic light scattering and the median particle size was 4.6 nm as depicted by the filled triangles in FIG. 1a. The measured optical transparency was about 97%.

Example 9

While stirring with a Teflon-coated magnetic stir bar, Component "A" was prepared by mixing 300 mL isopropyl alcohol with 2.0 mL deionized water followed by the addition of 6 mL titanium (IV) isopropoxide. Component "B" was made by adding 1 drop (~0.03 mL) concentrated ammonium hydroxide ($NH_4OH$) to 100 mL deionized water while stirring. The pH of Component "B" was ~9. Component "B" was rapidly added to stirring Component "A". A partially optically transparent (based on visual appearance, estimated to fall within the range of 5%<% T<20%, i.e. translucent) suspension of hydrous titanium (IV) oxide nanoparticles was formed. On a dry $TiO_2$ basis, the suspension contained about 0.5 wt. % $TiO_2$. The spectrum for the product of this Example is depicted in FIG. 3 by the line tagged with an open square; the optical transparency was measured to be 4% as shown in Table 2.

Example 10

The experiment was repeated with Component "A" prepared as described above in Example 9 and Component "B" prepared by adding 2 drops (~0.06 mL) concentrated ammonium hydroxide ($NH_4OH$) to 100 mL deionized water while stirring. Component "B" was rapidly added to stirring Component "A", and a more optically transparent suspension of hydrous titanium (IV) oxide nanoparticles was formed. The spectrum for this Example 10 is depicted in FIG. 3 as a line tagged with an open triangle; the optical transparency was 33% as shown in Table 2.

Example 11

This Example 11 illustrates the addition of base to the alcohol-water solution of Component "A", and the use of water as Component "B".

With stirring, a Component "A" was prepared by mixing 150 mL n-propyl alcohol, 1.0 mL deionized water, six drops (~0.2 mL) concentrated $NH_4OH$, followed by the addition of 6 mL titanium (IV) isopropoxide. To this stirring solution was rapidly added 45 mL deionized $H_2O$ as Component "B". A partially optically transparent (based on visual appearance, estimated to fall within the range of 5%<% T<20%) suspension of hydrous titanium (IV) oxide nanoparticles was formed. The molar ratio of $H_2O$:Ti in the suspension was about 128 to about 1. On a dry $TiO_2$ basis, the suspension contained about 0.9 wt. % $TiO_2$.

Example 12

While stirring with a Teflon-coated magnetic stir bar, Component "A" was prepared by mixing 300 mL isopropyl alcohol with 2.0 mL deionized water followed by the addition of 6.7 mL titanium (IV) isopropoxide. Component "B" was made by dissolving 0.4 g diammonium hydrogen phosphate (($NH_4)_2HPO_4$) in 100 mL deionized water. Component "A" was stirred in a 600 mL beaker with a Teflon-coated magnetic stirring bar as Component "B" was rapidly added to Component "A". A highly optically transparent suspension of hydrous titanium (IV) oxide nanoparticles, resembling a clear colorless solution, was formed. The molar ratio of $H_2O$:Ti in the suspension was about 252 to about 1. On a dry $TiO_2$ basis, the suspension contained about 0.5 wt. % $TiO_2$.

Example 13

This example illustrates the reaction of titanium (IV) isopropoxide in ethylene glycol containing water of hydration to form Component "A" mixed with a base as Component "B".

While stirring with a Teflon-coated magnetic stir bar, Component "A" was prepared by mixing 50 mL ethylene glycol containing water of hydration with 1 mL titanium (IV) isopropoxide. Component "B" was made by mixing two drops (about 0.07 mL) concentrated $NH_4OH$ with 15 mL deionized water. Component "A" was stirred in a 150 mL beaker with a Teflon-coated magnetic stirring bar as Component "B" was rapidly added to Component "A". A highly optically transparent suspension of hydrous titanium (IV) oxide nanoparticles, resembling a clear colorless solution, was formed. The molar ratio of $H_2O$:Ti in the suspension was about 245 to about 1. On a dry $TiO_2$ basis, the suspension contained about 0.4 wt. % $TiO_2$.

Example 14

While stirring with a Teflon-coated magnetic stir bar, Component "A" was prepared by mixing 300 mL isopropyl alcohol with 2.0 mL deionized water followed by the addition of 6.9 mL titanium (IV) n-butoxide. Component "8" was made by adding 8 drops (~0.25 mL) concentrated ammonium hydroxide ($NH_4OH$) to 100 mL deionized water with stirring.

Component "A" was stirred in a 600 mL beaker with a Teflon-coated magnetic stirring bar as Component "B" was rapidly added to Component "A". A highly optically transparent suspension of hydrous titanium (IV) oxide nanoparticles, resembling a clear colorless solution, was formed. The molar ratio of $H_2O$:Ti in the suspension was about 283 to about 1. On a dry $TiO_2$ basis, the suspension contained about 0.5 wt. % $TiO_2$. The particle size distribution was measured by dynamic light scattering and the median size ($d_{50}$) was 6.7 nm as depicted by the open circles in FIG. 1a. The measured light transmission is reported in FIG. 3 as an open triangle.

Example 15

Example 14 was repeated using 8.0 mL titanium (IV) n-butoxide with similar results. A highly optically transparent suspension of hydrous titanium (IV) oxide nanoparticles, resembling a clear colorless solution, was formed. The molar ratio of $H_2O$:Ti in the suspension was about 241 to about 1. On a dry $TiO_2$ basis, the suspension contained about 0.5 wt. % $TiO_2$.

Example 16

While stirring with a Teflon-coated magnetic stir bar, Component "A" was prepared by mixing 150 mL isopropyl alcohol with 1.0 mL deionized $H_2O$ followed by the addition of 3 mL titanium (IV) isopropoxide. Component "B" consisted of 50 mL concentrated ammonium hydroxide. With all ingredients at room temperature, Component "A" was stirred in a 400 mL beaker with a Teflon-coated magnetic stirring bar as Component "B" was rapidly added to Component "A". A highly optically transparent fluid suspension of hydrous titanium (IV) oxide particles was formed resembling a clear colorless solution that was stable for about two minutes before gelling. On a dry $TiO_2$ basis, the suspension contained about 0.5 wt. % $TiO_2$.

Example 17

While stirring with a Teflon-coated magnetic stir bar, Component "A" was prepared by mixing 150 mL isopropyl alcohol with 1.0 mL concentrated $NH_4OH$ followed by the addition of 3 mL titanium (IV) isopropoxide. Component "B" consisted of 50 mL deionized $H_2O$. Component "A" was stirred in a 400 mL beaker with a Teflon-coated magnetic stirring bar as the 50 mL of $H_2O$ were rapidly added to Component "A". A highly optically transparent suspension of hydrous titanium (IV) oxide nanoparticles, resembling a clear colorless solution, was formed. On a dry $TiO_2$ basis, the suspension contained about 0.5 wt. % $TiO_2$. The pH of the suspension was about 10 as measured by multi-strip pH paper.

Example 18

While stirring with a Teflon-coated magnetic stir bar, Component "A" was prepared by heating to 75° C. a solution consisting of 150 mL isopropyl alcohol and 1.0 mL deionized water in a 400 mL beaker. When 75° C. was obtained, 3.0 mL titanium (IV) isopropoxide were added. Component "B" was made by heating 50 mL $H_2O$ to 75° C., at which point, 6 drops (~0.18 mL) of concentrated $NH_4OH$ were added with stirring. Component "A" was stirred rapidly as Component "B" was rapidly added to Component "A". A highly optically transparent suspension of hydrous titanium (IV) oxide nanoparticles, resembling a clear colorless solution, was formed. On a dry $TiO_2$ basis, the suspension contained about 0.5 wt. % $TiO_2$. The particle size distribution was measured by dynamic light scattering and the median particle size was 6.4 nm as depicted by the filled circles in FIG. 1b. A sample of the product of this Example was aged for two months by placing the sample in a capped bottle and storing it at room temperature on a laboratory counter and the measured optical transparency of the aged sample was 66% as reported in Table 2. The transmission spectrum for the aged product of this Example is denoted in FIG. 3 by the line tagged with an open circle.

Examples 19-21 show spontaneous peptization of the products.

Example 19

While stirring with a Teflon-coated magnetic stir bar, Component "A" was prepared by mixing 100 mL isopropyl alcohol with 1.0 mL deionized water followed by the addition of 3.0 mL titanium (IV) isopropoxide. Component "B" was made by mixing 6 drops concentrated $NH_4OH$ (~0.18 mL) in 50 mL deionized water. Component "A" was stirred in a 400 mL beaker with a Teflon-coated magnetic stirring bar as Component "B" was rapidly added to Component "A". A cloudy white mixture was formed that became a highly optically transparent suspension, with the appearance of a clear colorless solution, after about 10 minutes. On a dry $TiO_2$ basis, the suspension contained about 0.6 wt. % $TiO_2$. The particle size distribution was measured by dynamic light scattering and the $d_{50}$ was 2.4 nm as depicted by the open triangles in FIG. 1b.

Example 20

While stirring with a Teflon-coated magnetic stir bar, Component "A" was prepared by mixing 100 mL isopropyl alcohol with 0.5 mL deionized water followed by the addition of 3.0 mL titanium (IV) isopropoxide. Component "B" was made by mixing 6 drops concentrated $NH_4OH$ (~0.18 mL) in 50 mL deionized water. Component "A" was stirred in a 400 mL beaker with a Teflon-coated magnetic stirring bar as Component "B" was rapidly added to Component "A". A cloudy white mixture was formed that clarified with time, becoming a highly optically transparent suspension, with the appearance of a clear colorless solution, after about 10 minutes. On a dry $TiO_2$ basis, the suspension contained about 0.6 wt. % $TiO_2$. The particle size distribution was measured by dynamic light scattering and the median particle size was 2.2 nm as depicted by the filled triangles in FIG. 1b.

Example 21

While stirring with a Teflon-coated magnetic stir bar, Component "A" was prepared by mixing 100 mL isopropyl alcohol with 1.0 mL deionized water followed by the addition of 3.0 mL titanium (IV) isopropoxide. Component "B" was made by mixing 12 drops concentrated $NH_4OH$ (~0.38 mL) in 100 mL deionized water. Component "A" was stirred in a 400 mL beaker with a Teflon-coated magnetic stirring bar as Component "B" was rapidly added to Component "A". A cloudy white mixture was formed that slowly clarified with time, becoming a highly optically transparent suspension, with the appearance of a clear colorless solution, after about 2 hours. The molar ratio of $H_2O$:Ti in the suspension was about 561 to about 1. On a dry $TiO_2$ basis, the suspension contained about 0.4 wt. % $TiO_2$. The particle size distribution was measured by dynamic light scattering and the median particle size was 4.1 nm as depicted by the open circles in FIG. 1b.

The following Examples 22-23 show the impact of the bases on the ability to crystallize the amorphous titanium (IV) oxide particle via a heat treatment.

Example 22

This example illustrates that hydrous titanium (IV) oxide nanoparticles made by solution reaction of titanium (IV) isopropoxide with ammonium hydroxide remain amorphous to X-rays even after boiling of the suspension for 6 hours.

A suspension of hydrous titanium (IV) oxide nanoparticles was prepared as described in Example 8. A 50 mL portion of suspension was evaporated to dryness at room temperature. An X-ray powder diffraction pattern showed the white powder to be amorphous.

Three 800 mL suspensions of hydrous titanium (IV) oxide nanoparticles, containing about 0.5 wt. % $TiO_2$ on a dry basis, were prepared in a manner similar to that described in Example 8. The three suspensions were heated to boiling for 5 minutes, 1 hour, and 6 hours, respectively. All three suspensions were highly optically transparent after heating with only a very small amount of flocculated solid present, and the suspensions resembled a clear colorless solution. Portions of heated suspension were evaporated to dryness at room temperature. X-ray powder diffraction patterns showed all three powders to be amorphous.

Example 23

This example illustrates that hydrous titanium (IV) oxide nanoparticles made by solution reaction of titanium (IV) isopropoxide with tetrasodiumpyrophosphate as the base are converted to crystalline anatase after boiling of the suspension for 6 hours.

A suspension of hydrous titanium (IV) oxide nanoparticles was prepared at room temperature following Example 5, except that 4 mL of water (instead of 2 mL) was used for Component "A" and 0.18 g of TSPP (instead of 0.72 g) was used for Component "B". A portion of the highly optically transparent suspension was evaporated to dryness at room temperature. X-ray powder diffraction of the recovered powder showed it to be amorphous.

Another batch of suspension of hydrous titanium (IV) oxide nanoparticles; containing about 0.5 wt. % $TiO_2$ on a dry basis, was prepared in the same manner (i.e., using 2 mL of water and 0.18 g of TSPP). The suspension was heated to boiling and refluxed for 6 hours. A portion of heated suspension was evaporated to dryness at room temperature. An X ray powder diffraction pattern of the recovered powder showed broad lines of anatase, and from the width of the strongest peak, an average crystal size of 6 nm was estimated.

Example 23 shows that the amorphous titanium (IV) oxide nanoparticles can be converted to the anatase form through a heat treatment. The crystallinity was confirmed through X-ray diffraction analysis. The crystallization of the amorphous titanium (IV) oxide, and the resulting photoactivity can, however, be controlled through judicious selection of the starting base. $NH_4OH$ is expected to yield a relatively low-photoactivity product in the phenol photo-oxidation test even after boiling of the suspension for 6 hours (as described in Example 22) because the product of Example 22 was amorphous, whereas, under the same heat treating conditions, tetrasodiumpyrophosphate is expected to produce, in the phenol photo-oxidation test, a highly photoactive material because of the crystallinity of the product of Example 23.

Example 24

This example illustrates that suspensions of hydrous titanium (IV) oxide nanoparticles can be concentrated to about 3-4 wt. % $TiO_2$ on a dry basis.

A 1200 mL suspension of hydrous titanium (IV) oxide nanoparticles was prepared by scaling up Example 8 by a factor of three. On a dry $TiO_2$ basis, the suspension contained about 0.5 wt. % $TiO_2$. 12 mL concentrated $NH_4OH$ were added to the suspension, and the suspension was vacuum distilled at about 25° C. until it became viscous and cloudy with a final volume of about 150 mL. On a dry $TiO_2$ basis, the concentrated suspension contained about 3-4 wt. % $TiO_2$. A portion of the concentrated suspension was evaporated to dryness at room temperature. X-ray powder diffraction of the recovered powder showed it to be amorphous.

Example 25

This example illustrates that spray-dried powder obtained from a suspension of hydrous titanium (IV) oxide nanoparticles, prepared according to the proportions used in Example 8, when tested in the phenol photo-oxidation test has a low photoactivity rate constant of $1.8 \times 10^3$ min$^{-1}$, (rate of disappearance of phenol) in a phenol photo-oxidation test as compared to that of a standard titanium (IV) oxide product, Degussa P25, which had a rate constant of $28.5 \times 10^3$ min$^{-1}$.

Example 26

This example shows that use of sodium pyrophosphate as base makes an amorphous product.

Example 5 was repeated, except that 13.3 mL titanium (IV) isopropoxide was added to the solution of 600 mL isopropyl alcohol and 2.0 mL $H_2O$. A portion of the prepared high optical transparency hydrous titanium (IV) oxide nanoparticle suspension was evaporated to dryness at room temperature. X-ray powder diffraction showed the powder to be amorphous.

Example 27

A suspension of hydrous titanium (IV) oxide nanoparticles, containing about 0.5 wt. % $TiO_2$ on a dry basis, was prepared according to the proportions used in Example 8. A powder was obtained from the suspension by evaporating a portion of the suspension. The powder was sieved to −200 mesh.

Example 28

Example 8 was repeated except that 6.7 mL titanium (IV) isopropoxide was added to the solution containing 300 mL isopropyl alcohol and 2 mL $H_2O$. The high optical transparency suspension, containing about 0.5 wt. % $TiO_2$ (dry basis) was evaporated to dryness at room temperature to recover a powder. The recovered powder was shown to be amorphous from X-ray powder diffraction.

Example 29

This example describes the synthesis of a concentrated suspension via vacuum distillation.

Figure 5:
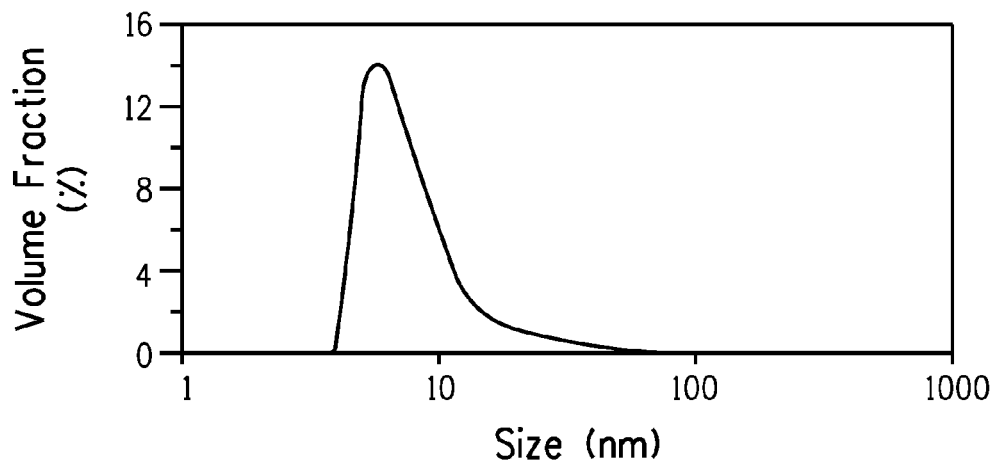
FIG. 5 shows the particle size distribution of a suspension made by diluting the concentrated hydrous titanium (IV) oxide suspension produced in Example 29.

A suspension of hydrous titanium (IV) oxide nanoparticles was prepared in a similar manner to that described in Example 28. Component "A" was prepared by mixing 900 mL isopropyl alcohol with 6.0 mL deionized water followed by the addition of 20 mL titanium (IV) isopropoxide. Component "B" was made by mixing about 1.5 mL concentrated ammonium hydroxide ($NH_4OH$) with 300 mL deionized water. Component "B" was rapidly added to stirring Component "A". A highly optically transparent suspension of hydrous titanium (IV) oxide nanoparticles, resembling a clear colorless solution, was formed. To the suspension was added 8.4 mL of tetraethylammonium hydroxide solution (25 wt. % in methanol) with stirring to achieve a weight percent concentration of tetraethylammonium hydroxide of approximately 0.15 wt. %. The synthesis was repeated three times, and the four batches of suspension were used as the source material that was vacuum distilled at about 30° C. to produce a concentrated suspension that was fluid and relatively optically transparent having a slightly translucent appearance as compared to the source system. The hydrous titanium (IV) oxide nanoparticle concentration was about 10.1 wt. %, based on $TiO_2$. A portion of this concentrate was diluted with water to about 0.1 wt. % $TiO_2$ for PSD determination. The median particle size was about 8 nm as measured by dynamic light scattering (see FIG. 5).

Example 30

This example describes the synthesis of a concentrated suspension via vacuum distillation.

A suspension of hydrous titanium (IV) oxide nanoparticles was prepared in a similar manner to that described in Example 28. Component "A" was prepared by mixing 900 mL isopropyl alcohol with 6.0 mL deionized water followed by the addition of 20 mL titanium (IV) isopropoxide. Component "B" was made by mixing about 1.7 mL concentrated ammonium hydroxide ($NH_4OH$) with 300 mL deionized water. Component "B" was rapidly added to stirring Component "A". A highly optically transparent suspension of hydrous titanium (IV) oxide nanoparticles, resembling a clear colorless solution, was formed. To the suspension was added 10 mL of tetra-n-butylammonium hydroxide solution (31 wt. % in methanol) with stirring to achieve a weight percent concentration of tetra-n-butylammonium hydroxide equal to approximately 0.25 wt. %. The synthesis was repeated seven times, and the eight batches of suspension were used as the source material that was vacuum distilled at about 30° C. to produce a concentrated suspension that was fluid and relatively optically transparent having a slightly translucent appearance as compared to the source system. The hydrous titanium (IV) oxide nanoparticle concentration was about 17.8 wt. %, based on $TiO_2$.

Example 31

This example describes the direct synthesis of concentrated suspensions.

While stirring with a Teflon-coated magnetic stir bar, Component "A" was prepared by mixing 150 mL isopropyl alcohol with 1.0 mL deionized water followed by the addition of 10 mL titanium (IV) isopropoxide. Component "B" was made by mixing 5 mL tetra-n-butylammonium hydroxide solution (31 wt. % in methanol) into 50 mL deionized water. Component "B" was rapidly added to stirring Component "A". A highly optically transparent suspension of hydrous titanium (IV) oxide nanoparticles, resembling a clear colorless solution, was formed after stirring for a few minutes. The molar ratio of $H_2O$:Ti in the suspension was about 84 to about 1. The pH of the nanoparticle suspension was ~8. On a dry $TiO_2$ basis, the suspension contained about 1.4 wt. % $TiO_2$.

The synthesis was repeated with 20 mL titanium (IV) isopropoxide and 10 mL tetra-n-butylammonium hydroxide solution (31 wt. % in methanol). Initially, a white, opaque suspension was formed that transformed, over a period of about 20 minutes, into a fluid and highly optically transparent suspension of hydrous titanium (IV) oxide nanoparticles resembling a clear colorless solution. The pH of the nanoparticle suspension was ~8. On a dry $TiO_2$ basis, the suspension contained about 2.7 wt. % $TiO_2$.

Example 32

This example illustrates reaction of titanium (IV) isopropoxide (a.k.a., Tetraisopropyltitanate, $Ti(OCH(CH_3)_2)_4$) in isopropyl alcohol containing about 0.8 wt. % $H_2O$ with a different base, tetraethyl ammonium hydroxide.

With stirring from a Teflon-coated magnetic stir bar, Component "A" was prepared by mixing 100 mL of isopropyl alcohol containing about 0.8 wt. % $H_2O$, with 4.0 mL titanium (IV) isopropoxide. Component "B" was made by mixing 9 drops (~0.45 mL) of a 25 wt. % solution of tetraethylammonium hydroxide in methanol with 33 mL deionized water. Component "A" was stirred in a Pyrex beaker with a Teflon-coated magnetic stirring bar as Component "B" was rapidly added to Component "A". A highly optically transparent suspension of hydrous titanium (IV) oxide nanoparticles, resembling a clear colorless solution, was formed. The molar ratio of $H_2O$:Ti in the suspension was about 139 to about 1. On a dry $TiO_2$ basis, the suspension contained about 0.9 wt. % $TiO_2$.

Example 33

This example demonstrates how turbulence intensity when mixing Component "A" and "B" can impact agglomeration of the nanoparticles. Component "A" was prepared by first adding enough water to dry isopropyl alcohol to attain a water content of approximately 0.8 wt. % and then stirring in titanium isopropoxide to achieve a titanium isopropoxide concentration of about 2.6 wt. %. Component "B" was prepared by stirring enough concentrated $NH_4OH$ into water to attain an $NH_4OH$ concentration of about 0.16 wt. %. Three different means were used to combine A with B to produce nanoparticles. The first experiment used a homogenizer with a rotor/stator configuration, where the rotational speed of the blades could be varied from 0 to 10,000 rpm. The shear rate, defined above, ranged from 0 to 13,660 $s^{-1}$ as shown in Table 1 (a-d). To compare, the shear rate used in Comparative Example C was only about 16 $s^{-1}$. Components "A" and "B" were fed into the homogenizer at constant flow rates of 120 and 40 mL/min, respectively. Samples of the product of the Example were taken under the same flow conditions for a number of rotational speeds; the results of the particle size distribution and optical transparency analysis are reported in Table 1. Example 33b (produced with the rotor spinning at 2000 rpm), produced particles with a median size of 4.6 nm and a volume-based $d_{90}$ ($90^{th}$ percentile) size of 6.9 nm. The optical transparency of the suspension was 98% (see Tables 1 and 2). Without the shear provided by the spinning blade, the reaction produced very large particles. The transmission spectrum for the product of Example 33b is reported in FIG. 3 denoted by a filled triangle.

The second experiment (e and f in Table 1) used a "T" mixer with two opposing flows to combine Components "A" and "B". The T-mixer is shown in FIG. 6. The "T" mixer was composed of a ¼ inch (0.630 cm) diameter mixing tube 2 having an upper portion 3 with two feed tubes 4a and 4b fitted at the upper portion of the mixing tube 2 each feed tube having an end 6a and 6b positioned perpendicular to the ¼ inch diameter mixing tube each feed tube for introducing one of the solutions into the mixing tube. The feed tubes were positioned within the mixing tube such that there was a ⅛ inch (0.318 cm) gap 7 located between the ends of each feed tube. In this Example the feed tube diameter for Component "A" was ⅛ inch (0.318 cm) in diameter, the feed tube diameter for Component "B" was 1/16 inch (0.160 cm) in diameter. All diameters refer to the outer diameter of the tubes. The flow rate of Component "B" was fixed at 8 mL/min, and two flow rate conditions were tried for Component "A": 20 mL/min (a total flow of 28 mL/min) and 32 mL/min (a total flow of 40 mL/min). Evidently the mixing achieved under these conditions was not as good as with the homogenizer, because the product was significantly larger and less optically transparent.

A third experiment (g in Table 1) used a static mixer to combine A and B under higher flow conditions, and the result was a product comparable to that obtained with the homogenizer.

by filled circles) is nearly the same as that for a 0.1 wt. % suspension of the plasma-produced anatase titania (denoted by open triangles). The absorbance curves have a slightly different shape due to scattering caused by larger particles (median size 30 nm) in the plasma-produced sample. Both the amorphous and crystalline titanium (IV) oxide particles absorb ultraviolet energy at wavelengths shorter than about 335 nm, whereas in the visible spectrum the absorption is very low. As predicted by Beers Law, the absorbance at a given wavelength is four times greater for a 0.4 wt. % suspension of the amorphous titanium (IV) oxide of Example 4 denoted in FIG. 2 by open circles) than for the 0.1 wt. % suspension. The weight percent was based on the weight of dry titanium (IV) oxide that could be obtained from the suspension.

In FIG. 3 the measured transmission coefficient (%) is shown as a function of wavelength (nm) over the visible part of the electromagnetic spectrum for products made in accordance with Comparative Example C and Examples 7; 9, 10, 18 and 33b. The wavelength-dependent sensitivity of the human eye (the photopic luminous efficiency function, published by the International Committee on Illumination (CIE)

TABLE 1

Effect of Mixing Conditions

| Sample | Equipment | Operating Condition | Shear rate (s$^{-1}$) | $d_{10}$ (nm) | $d_{50}$ (nm) | $d_{90}$ (nm) | Optical Transparency (%) |
|---|---|---|---|---|---|---|---|
| a | Homogenizer | rotor 0 rpm | ~0 | 324 | 2566 | >3000 | 2 |
| b | Homogenizer | rotor 2000 rpm | 2730 | 2.6 | 3.7 | 5.6 | 98 |
| c | Homogenizer | rotor 5000 rpm | 6830 | 2.8 | 3.8 | 5.6 | 98 |
| d | Homogenizer | rotor 10,000 rpm | 13,660 | 3.1 | 4.1 | 5.7 | 97 |
| e | T-mixer | flow rate 28 mL/min | not known | 10 | 12 | 40 | 11 |
| f | T-mixer | flow rate 40 mL/min | not known | 8 | 10 | 22 | 18 |
| g | Static mixer | flow rate over 100 mL/min | not known | 4 | 5 | 9 | 98 |
| Comp. Example C | Stirring bar in a beaker | stir bar 400 rpm | 16 | | 54000 | | <0.01 |

Stability of suspensions as demonstrated by the absence of a settled layer of agglomerated particles has been observed after a period of over one year.

Example 33 demonstrates that when the mixing was accomplished with sufficient vigor the desired nanoparticles were formed.

Figure 1B:
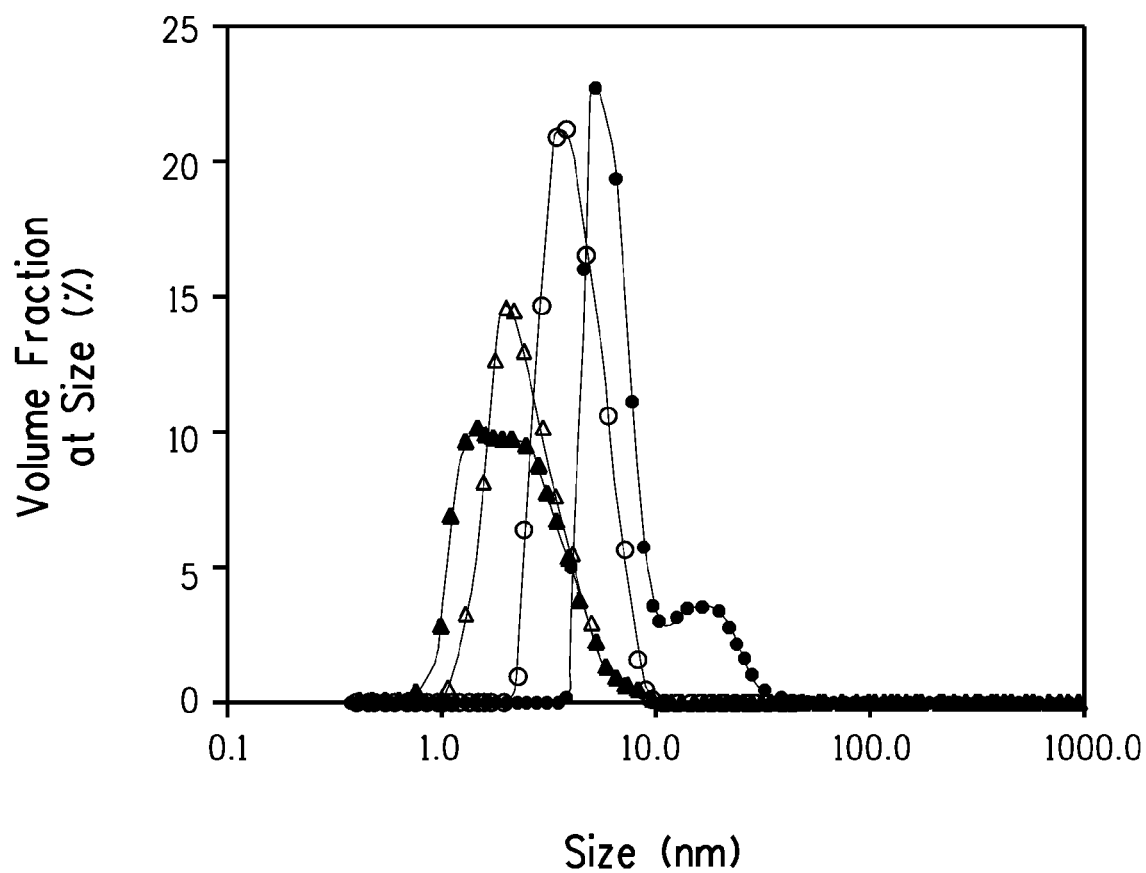

FIGS. 1a and 1b show the volume-weighted median particle size distribution, determined by dynamic light scattering, of directly-made titanium (IV) oxide suspensions of several of the Examples. FIG. 1a is a plot of the weight fraction at size (%) v. size (nm) for the products of Examples 4, 7, 8, and 14. The particle size distributions are shown to lie in the range of about 2-about 7 nm, with a typical median particle size of approximately 5 nm.

FIG. 1b is a plot of the weight fraction at size (%) v. size (nm) for the products of Examples 18, 19 and 20. The particle size distributions are shown to lie in the range of about 1 to about 10 nm with a small shoulder for the product of Example 18 between about 10 and about 50 nm.

Figure 2:
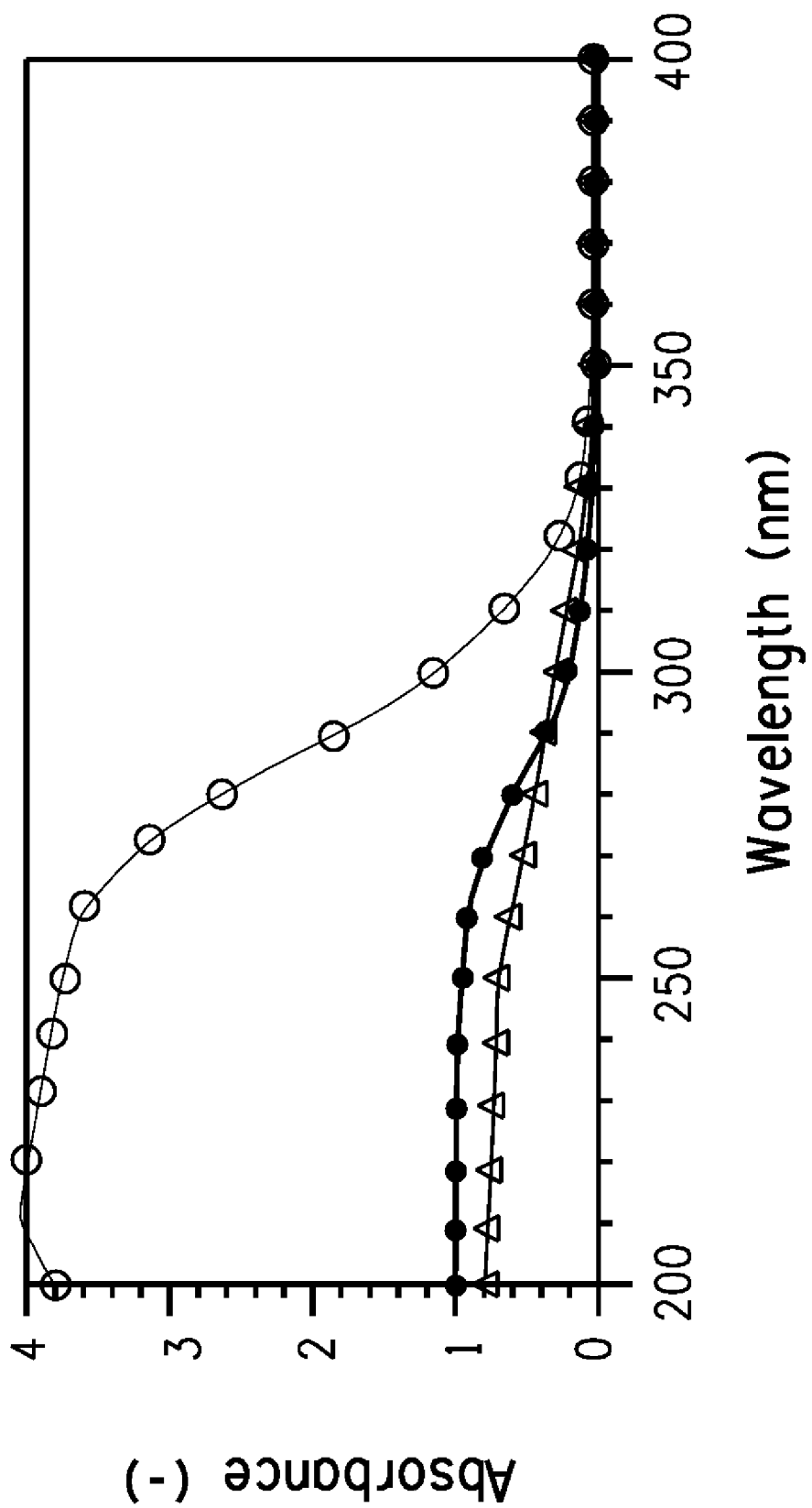
FIG. 2 shows the UV-Visible absorption spectra for suspensions of hydrous titanium (IV) oxide.

FIG. 2 shows that the absorption spectrum for a 0.1 wt. % suspension of nanoparticles made by diluting a 3 mL suspension of Example 4 with 9 mL of water (denoted in the figure in 1988) is shown for reference as a dashed line. With the exception of Comparative Example C, these samples were prepared according to the Examples 7, 9, 10, 18 and 33b and have not been diluted or otherwise altered in any way.

FIG. 3 shows that even when the sample of the product of Comparative Example C is diluted to a solids concentration of 0.1 wt. %, based on the entire weight of the diluted sample, it is almost completely opaque, as shown by its transmission spectrum, denoted by the dashed line tagged with an "x". In contrast, the measured transmission spectra of the examples produced by the present disclosure are seen to have varying degrees of optical transparency. For example, Example 9 (using a minimal amount of base) is denoted by the line with the open square. Example 10 (made using a larger concentration of base than Example 9), denoted by the line with the open triangle, transmits significantly more light. Example 18 (denoted by an open circle) shows that the suspensions made with the present disclosure remain relatively clear even after 2 months of storage. Example 7 (denoted with a filled circle) and Example 33b (denoted with a filled triangle) exhibit extraordinarily high optical transparency. The optical transparency for each of the spectra shown in FIG. 3 was calculated and the results reported in Table 2.

TABLE 2

Optical Transparency of TiO$_2$ Samples to Visible Light

| Sample | Transparency to Visible Light |
| --- | --- |
| Comparative Example C | <0.01% |
| Comparative Example C (diluted 22:1) | 0.2% |
| Example 9 | 4% |
| Example 10 | 33% |
| Example 18 (aged 2 months) | 66% (after 2 months) |
| Example 7 | 95% |
| Example 33b | 98% |
| Pure, ultrafiltered water | 100% |

According to Beer's Law, an increase in the solids concentration will have the same effect as increasing the optical path length: the optical transparency will decrease. Therefore before any direct comparison between two samples can be made, one must ensure that their particle concentrations are equal. In the Examples discussed above, the concentration was about 0.5 wt. %. The undiluted Comparative Example C as about 2.2 wt. %, but even when diluted to 0.1 wt. %, the Comparative Example was still opaque.

Figure 4:
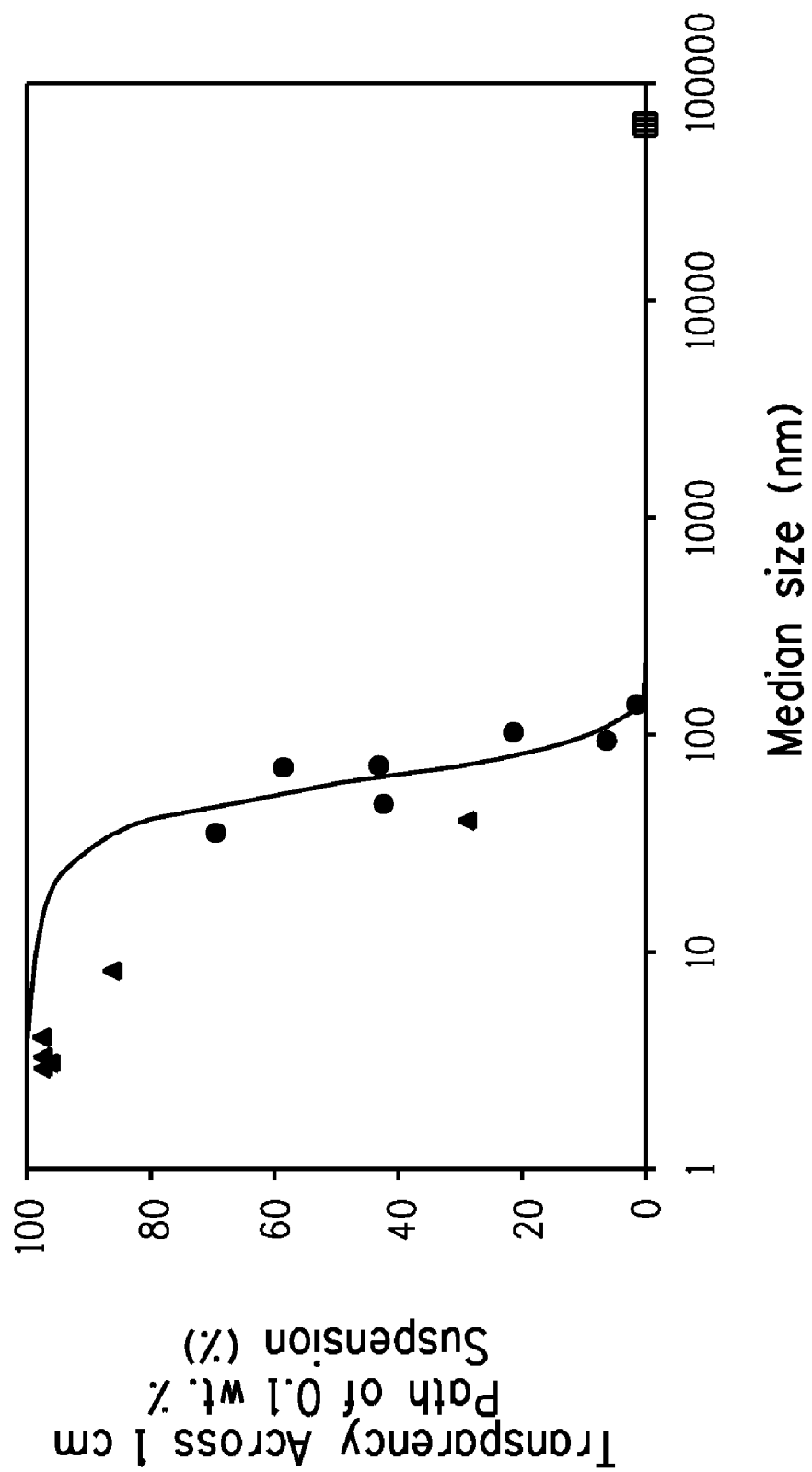
FIG. 4 shows theoretical and experimentally observed optical transparency values (measured across a 1 cm path length) as a function of median particle size for a variety of suspensions of titanium (IV) oxide.

The reason for the varying amount of optical transparency observed in various nano titanium (IV) oxide samples is that the particle size distribution (PSD) or refractive index (which is determined by the crystallinity) was not the same. FIG. 4, shows the data obtained by preparing a number of 0.1 wt. % titanium (IV) oxide suspensions and measuring both median particle size and optical transparency (% T). In FIG. 4, triangles denote suspensions of amorphous titanium (IV) oxide made in accordance with Examples 9, 18, and 33 and diluted to 0.1 wt. %; circles denote suspensions of rutile titanium (IV) oxide made via the combustion of TiCl$_4$, and the square denotes the suspension made in accordance with Comparative Example C. It is evident that the reason for the opacity of the suspension produced in Comparative Example C is that its median particle size is 10,000 times larger than that of the suspensions of the Examples.

The optical transparency of a suspension is determined by the complex refractive index and size distribution of the particles and by the refractive index of the liquid. The scattering of light by particles in a suspension is a well-studied phenomenon, the theoretical framework of which was completely described by Gustav Mie [Annalen der Physik 25:377-445 (1908)] nearly 100 years ago.

The solid line in FIG. 4 was the result of calculations made based on Mie scattering theory, where a log-normal distribution with a geometric standard deviation of 1.1 was assumed for the PSD and the complex index of refraction for amorphous titanium (IV) oxide was provided by B. Karunagaran et al., Cryst. Res. Technol. 38:773-778 (2003). The calculation assumed an optical path length of 1 cm and a particle concentration of 0.1 wt. %. Both theory and empirical data show that suspensions of particles with diameters greater than about 100 nm will be opaque, and that very optically transparent suspensions (based on visual appearance, estimated % T>90%) are obtained only when the median particle size is smaller than about 10 nm. Suspensions with wide particle size distributions (those with larger geometric standard deviations) will be less optically transparent than predicted here due to increased scattering of light caused by the larger amount of coarse particles.

It is noted that "white turbid" suspensions appear white because the particles in them scatter visible light completely. Since scattered light is not transmitted in the direction of the incident light rays, the transmission coefficient goes to zero over a relatively short path length in such suspensions. The theoretical and empirical results shown in FIG. 4 show that such suspensions have median particle sizes than exceed 100 nm.

Both theory and empirical data reported in FIG. 4 showed that suspensions of particles with diameters greater than about 100 nm are of necessarily opaque due to increased scattering of light by the larger particles, and that very optically transparent suspensions (% T>90%) can be obtained only when the median particle size is smaller than about 10 nm. Of course, suspensions with wide particle size distributions (those with larger geometric standard deviations) are expected to be less optically transparent than predicted here due to increased scattering of light caused by the larger amount of coarse particles.

Example 34

In this Example the titanium (IV) oxide nanoparticles were surface treated with a thin silica coating to reduce further the inherently low photoactivity.

A solution was made by stirring 1 mL of TEOS (Si (OCH$_2$CH$_3$)$_4$) into 19 mL of isopropyl alcohol; this TEOS solution was loaded into a syringe pump. The pump was set to deliver the TEOS solution at a rate of 1.5 mL/hr into a stirred beaker containing 100 mL of the suspension made in Example 5. The TEOS solution was fed into the suspension while stirring with a magnetic stir bar continuously for 4 hours. Samples (about 2 mL each) were taken at one-hour intervals for particle size measurement.

After 2 hours, about 10% of the particle volume was agglomerated to a size of about 16 nm, but this agglomeration decreased with time; at 3 hours this agglomeration contained only a few percent of the total particle volume, and after 4 hours the agglomeration disappeared completely. After a total of 4 hours, the syringe pump was turned off and the beaker was set aside (without stirring) overnight. The next Morning some of the previously optically transparent suspension had agglomerated and formed a less optically transparent layer at the bottom of the beaker, but the top half of the suspension was still optically transparent. The larger particle size in the bottom half of the beaker is evidence that some agglomeration or flocculation had occurred overnight.

The particle size of the suspension were reported in Table 3 as a function of time and the total TEOS addition.

TABLE 3

| Time (hours) | Total TEOS (mL) | Median size (nm) |
| --- | --- | --- |
| 0 | 0 | 5.7 |
| 1 | 1.5 | 5.7 |
| 2 | 3.0 | 6.4 |
| 3 | 4.5 | 7.2 |
| 4 | 6.0 | 7.2 |
| about 20 | 6.0 | 4.9 (top half) |
| about 20 | 6.0 | 10.0 (bottom half) |

The suspension was decanted into a separate container and dried to form a powder.

Example 35

In this Example a suspension of amorphous hydrous titanium (IV) oxide nanoparticles were produced in a continuous or semi-continuous process.

Using the same proportions of Example 33 to produce sufficient quantities of Component "A" and Component "B", the two components were combined using three different continuous mixing means as shown in Table 6. All three mixing means were observed to be capable to producing the suspension of this disclosure.

The homogenizer had a rotor/stator configuration arranged so that the two components were fed on opposite sides of the stator plate, thus ensuring maximum mixing.

The T-mixer was made from commercial tubing and tube fittings and as depicted in FIG. 6. The feed tube for Component "A" was made of 3.2 mm tubing, the feed tube for Component "B" was made of 1.6 mm' tubing, and the end of each feed tube was separated by a 3.2 mm gap located in a 6.4 mm tubing for the mixing tube to form the T-mixer. Tube diameters refer to the outer diameter of the tube. The cross-sectional areas of the tubes were chosen so that the volumetric flow rate required to mix the two components in the correct ratio would yield approximately equal velocities of the two jets.

The static mixer was formed from a commercial static in-line mixer, with the Component "B" feed tube inserted into the middle of the mixer. This arrangement was used to produce about 10 liters of suspension at a rate of about a liter per minute. This process can be scaled to much larger production rates.

Example 36

This Example demonstrates the production of a dry flowable powder from the suspension produced by the static mixer in Example 35. This powder can be re-dispersed in a liquid if desired.

Feed suspension produced by the static mixer in Example 35 was distilled to a concentration of about 1.5% (on a dry $TiO_2$ basis). The concentrated suspension was fed through an atomizing nozzle into a 1-meter diameter spray drying chamber. Compressed nitrogen was supplied to the annular gap of the nozzle at a pressure of 30 psig. Drying nitrogen (heated to 120-130° C.) was supplied to the chamber at a rate of 60-80 kg/hr. The dryer exhausted to a small bad filter containing 9 filter elements of Teflon® coated polyester with a combined filtration area of about 0.8 m². Due to the fine size of the powder, the filter bags were not back-pulsed during the drying step. In order to separate the powder from the filters, the bags were back-pulsed at the conclusion of the drying run, without drying gas or feed flowing to the dryer. Over 130 g of powder was produced; this powder was extremely light, easily fluidized, and easily entrained in gas flow. The powder, once fluidized (in air), was slow to de-aerate. The bulk density of de-aerated powder was only about 320 kg/m³.

The particles in this powder were observed with SEM to be agglomerates of titanium (IV) oxide nanoparticles. Laser diffraction measurements of the particle size distribution of the dry powder showed the $d_{50}$ to be about 2 micrometers, although a substantial fraction (about 20% of the volume) was less than 1 micrometer. When re-dispersed in water with sonication for 1 minute, the $d_{50}$ (median size) of the suspension was measured with dynamic light scattering to be about 90 nm.

Example 37

This example illustrates that reaction of titanium (IV) isopropoxide (a.k.a., Tetraisopropyltitanate, $Ti(OCH(CH_3)_2)_4$) in isopropyl alcohol containing about 1.6 wt. % $H_2O$ with a base gives the nano-sized particles of hydrous titanium (IV) oxide but transforms within 10 seconds into an opaque slurry. The water to titanium molar ratio of the mixture was about 286. While stirring with a Teflon-coated magnetic stir bar, Component "A" was prepared by mixing 300 mL isopropyl alcohol with 4.0 mL deionized water followed by the addition of 6 mL titanium (IV) isopropoxide. Component "B" was made by dissolving 0.72 g tetrasodiumpyrophosphate decahydrate (TSPP) in 100 mL deionized water. Component "A" was stirred in a 600 mL beaker with a Teflon-coated magnetic stirring bar as Component "B" was rapidly added to Component "A". A highly optically transparent suspension resembling a clear colorless solution was formed that transformed into an opaque white slurry within 10 seconds.

Example 38

This example illustrates the result of reaction of titanium (IV) isopropoxide (Tetraisopropyltitanate, $Ti(OCH(CH_3)_2)_4$) in isopropyl alcohol containing about 0.8 wt. % $H_2O$ with a sodium hydroxide as the base.

With stirring from a Teflon-coated magnetic stir bar, Component "A" was prepared by mixing 150 mL isopropyl alcohol with 1 mL deionized water followed by the addition of 3 mL titanium (IV) isopropoxide. Component "B" was made by mixing one drop (~0.04 mL) 10 M NaOH with 50 mL deionized water. The pH of Component "B" was about 11. Component "A" was stirred in a 400 mL beaker with a Teflon-coated magnetic stirring bar as Component "B" was rapidly added to Component "A". A highly optically transparent suspension resembling a clear colorless solution of hydrous titanium oxide nanoparticles was formed. On a dry $TiO_2$ basis, the suspension contained about 0.5 wt. % $TiO_2$.

Example 39

This example illustrates the result of slow mixing of titanium (IV) isopropoxide (Tetraisopropyltitanate, $Ti(OCH(CH_3)_2)_4$) in isopropyl alcohol containing about 0.8 wt. % $H_2O$ with $NH_4OH$ as the base.

With stirring from a Teflon-coated magnetic stir bar, Component "A" was prepared by mixing 150 mL isopropyl alcohol with 1 mL deionized water followed by the addition of 3 mL titanium (IV) isopropoxide. Component "B" was made by mixing four drops (~0.12 mL) concentrated $NH_4OH$ with 50 mL deionized water. Component "A" was stirred in a 400 mL beaker with a Teflon-coated magnetic stirring bar as Component "B" was added in a steady stream over a period of about 30 seconds. An optically translucent suspension of hydrous titanium (IV) oxide nanoparticles was formed. The optically translucent suspension produced no settled solids after sitting for six hours.

The description of illustrative and preferred embodiments of the present invention is not intended to limit the scope of the invention. Various modifications, alternative constructions and equivalents may be employed without departing from the true spirit and scope of the appended claims.

What is claimed is:

1. A process for making a self-deagglomerating suspension of finely divided titanium (IV) oxide nanoparticles, comprising the following steps:
   1) mixing with a vigor equivalent to a shear rate of greater than 100s-1 (a) and (b) wherein
      (a) a volume of a first component comprising an alcohol in an amount of more than 50 wt. % based on the weight of the first component, a titanium alkoxide in an amount ranging from 0.001 wt. % to 6 wt. % based on the weight of the first component, and a titanium alkoxide activator in an amount ranging from 0.2 wt. % to 1.6 wt. % based on the weight of the first component, the titanium alkoxide activator being selected from the group consisting of water and a first aqueous base selected from the group consisting of ammonium hydroxide, sodium hydroxide, sodium pyrophosphate, potassium pyrophosphate, sodium citrate, diammonium hydrogen phosphate and mixtures thereof, and (b) a volume of a second component selected from the group consisting of water and a second aqueous base selected from the group consisting of ammonium hydroxide, sodium hydroxide, sodium pyrophosphate, potassium pyrophosphate, sodium citrate, diammonium hydrogen phosphate and mixtures thereof, and at least one of the first component or the second component having a base therein, 2) rapidly forming a mixture comprising agglomerated titanium (IV) oxide particles that deagglomerate over time into an optically transparent suspension of titanium (IV) oxide nanoparticles.

2. The process of claim 1 in which the titanium alkoxide is selected from the group consisting of titanium (IV) isopropoxide, titanium (IV) n-butoxide, titanium (IV) methoxide, titanium (IV) ethoxide, and titanium (IV) n-propoxide and mixtures thereof.

3. The process of claim 1 in which the first aqueous base is in a concentration up to about 0.2 M in the first component.

4. The process of claim 1 in which the second aqueous base is in a concentration ranging from about 0.001 M to about 0.030 M in the second component.

5. The process of claim 1 in which the second aqueous base is ammonium hydroxide in a concentration ranging from about 0.006 M to about 14.8 M in the second component.

6. The process of claim 1 in which the alcohol is selected from the group consisting of methanol, ethanol, n-propanol, isopropanol, ethylene glycol, and butanediol and mixtures thereof.

7. The process of claim 1 in which the optically transparent suspension of titanium (IV) oxide nanoparticles has an optical transparency greater than about 4% over a 1 cm path length.

8. The process of claim 1 in which the optically transparent suspension of titanium (IV) oxide nanoparticles has an optical transparency greater than about 90% over a 1 cm path length.

* * * * *

UNITED STATES PATENT AND TRADEMARK OFFICE
Certificate

Patent No. 8,114,804 B2                                                                   Patented: February 14, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: David M. Scott, Wilmington, DE (US); and Carmine Torardi, Wilmington, DE (US).

Signed and Sealed this Seventeenth Day of July 2012.

<div align="right">
Melvin C. Mayes<br>
Supervisory Patent Examiner<br>
Art Unit 1732<br>
Technology Center 1700
</div>